(12) United States Patent
Savvides et al.

(10) Patent No.: US 8,630,965 B2
(45) Date of Patent: Jan. 14, 2014

(54) FRAMEWORK OF HIERARCHICAL SENSORY GRAMMARS FOR INFERRING BEHAVIORS USING DISTRIBUTED SENSORS

(75) Inventors: Andreas Savvides, Hamden, CT (US); Dimitrios Lymberopoulos, Bellevue, WA (US); Yiannis Aloimonos, College Park, MD (US); Abhijit S. Ogale, Mountain View, CA (US)

(73) Assignee: Yale University, New Haven, CT (US)

( * ) Notice: Subject to any disclaimer, the term of this patent is extended or adjusted under 35 U.S.C. 154(b) by 659 days.

(21) Appl. No.: 12/296,078

(22) PCT Filed: Apr. 6, 2007

(86) PCT No.: PCT/US2007/066179
§ 371 (c)(1),
(2), (4) Date: Mar. 2, 2010

(87) PCT Pub. No.: WO2007/118213
PCT Pub. Date: Oct. 18, 2007

(65) Prior Publication Data
US 2010/0153321 A1    Jun. 17, 2010

Related U.S. Application Data

(60) Provisional application No. 60/790,343, filed on Apr. 6, 2006, provisional application No. 60/790,672, filed on Apr. 10, 2006, provisional application No. 60/794,289, filed on Apr. 21, 2006.

(51) Int. Cl.
*G06F 15/18* (2006.01)
*G06N 3/00* (2006.01)
*G06N 3/12* (2006.01)

(52) U.S. Cl.
USPC .......................................................... 706/13

(58) Field of Classification Search
USPC .......................................................... 706/13
See application file for complete search history.

(56) References Cited

U.S. PATENT DOCUMENTS

| | | | |
|---|---|---|---|
| 5,652,897 A | 7/1997 | Linebarger et al. | |
| 6,546,553 B1 * | 4/2003 | Hunt | 717/174 |
| 2002/0013793 A1 * | 1/2002 | Bergan et al. | 707/526 |
| 2004/0002838 A1 * | 1/2004 | Oliver et al. | 703/2 |
| 2004/0243407 A1 * | 12/2004 | Yu et al. | 704/240 |
| 2006/0034726 A1 * | 2/2006 | Sunshine et al. | 422/58 |
| 2006/0041378 A1 | 2/2006 | Cheng et al. | |

OTHER PUBLICATIONS

Dale et al. (2003) CORAL: using natural language generation for navigational assistance. Proceedings of the 26th Australasian computer science conference. 16: 35-44.

International Search Report for Application No. PCT/US2007/066179 mailed Mar. 5, 2008.

Written Opinion for Application No. PCT/US2007/066179 mailed Mar. 5, 2008.

International Preliminary Report on Patentability for Application No. PCT/US2007/066179 mailed Oct. 8, 2008.

(Continued)

*Primary Examiner* — Kakali Chaki
*Assistant Examiner* — Ababacar Seck
(74) *Attorney, Agent, or Firm* — Ballard Spahr LLP

(57) ABSTRACT

Provided herein are methods, systems, and apparatuses that can utilize a grammar hierarchy to parse out observable activities into a set of distinguishable actions.

46 Claims, 24 Drawing Sheets

(56) References Cited

OTHER PUBLICATIONS

Aggarawl JK, Park S. (2004) Human Motion: Modeling and Recognition of actions and interactions. Proceedings of the 2$^{nd}$ International Symposium on 3D Data Processing Visualization and Transmission. 3DPVT, pp. 640-647.
Bestavros A, Bradley AD, Kfoury AJ, Ocean M. (Oct. 2005) Snbench: A development and run-time platform for the rapid deployment of video sensornet applications. Proceedings of the 2$^{nd}$ IEEF/CreateNet Workshop on Broadband Advanced Sensor Networks (BaseNets).
Betke M, Hariatoglu I, Davis L. (2000) Real time multiple vehicle detection and tracking from a moving vehicle. Machine Vision and Applications, 12: 69-83.
Bouguet JY. Camera calibration toolbox for Matlab.
Cerpa A, Elson J, Estrin D, Girod L, Hamilton M, Zhao J. (Apr. 2001) Habitat monitoring: Application driver for wireless communications technology. Proceedings of the First ACM SIGCOMM Workshop on Data Communications in Latin America and the Caribbean, Apr. 3-5, 2001, San Jose, Costa Rica. (Also published as UCLA Computer Science Technical Report 200023 in Dec. 2000).
Chowdhury AR, Chellappa R. (Aug. 2005) Statistical bias in 3-D reconstruction from a monocular video. IEEE Trans. Image Processing, 4: 1057-1062.
Elgammal A, Duraiswami R, Harwood D, Davis LS. (Jul. 2002) Background and foreground modeling using non-parametric kernel density estimation for visual surveillance. Proceedings of the IEEE.
Elgammal A, Shet V, Yacoob Y, Davis LS. (2003) Learning Dynamics for Exemplar-based Gesture Recognition. CVPR'03.
Ford B (Oct. 2002). Packrat parsing: Simple, powerful, lazy, linear time. International Conference of Functional Programming.
Ford B. (Jan. 2004) Parsing expression grammars: A recognition-based syntactic foundation. Principles on Programming Languages.
Forney GD. (Mar. 1973) The viterbi algorithm. Proceedings of the IEEE, 61: 268-278.
Frank C, Römer K. (Nov. 2005) Algorithms for generic role assignment in wireless sensor networks. Proceedings of the 3$^{rd}$ International Conference on Embedded Networked Sensor Systems (SenSys), pp. 230-242.
Fung WF, Sun D, Gehrke J. (2002) COUGAR: The network is a database. ACM SIGMOD.
Geman S, Johnson M. (2002) Probabilistic grammars and their applications. International Encyclopedia of the Social & Behavioral Sciences. NJ Smelser and P.B. Baltes (Eds.), Pergamon: Oxford., pp. 12075-12082.
Govindan R, Kohler E, Estrin D, Bian F, Chintalapudi K, Gnawali O, Gummadi R, Rangwala S, Stathopoulos T. (2005) Tenet: An architecture for tiered embedded networks. Technical report, CDNS, No. 7, UCLA.
Gummadi R, Gnawali O, Govindan R. (Jun. 2005) Macro-programming wireless sensor networks using Kairos. Proceedings of the 3$^{rd}$ International Conference on Distributed Computing in Sensory Systems (DCOSS), pp. 163-176.
Han CC, Kumar R, Shea R, Kohler E, Srivastava M. (2005) A dynamic operating system for sensor nodes. MobiSys. 3$^{rd}$ International Conference on Mobile Systems, Applications, and Services.
Han CC, Kumar R, Shea R, Kohler E, Srivastava M. (Nov. 2004) A dynamic operating system for sensor nodes. Technical Report NESL-TM-2004-11-01, University of California Los Angeles, Networked Embedded Systems Lab.
Hauptmann A, Gao J, Yang R, Qi Y, Yang H, Wactar H. (2004) Automated analysis of nursing home observations. IEEE Pervasive Computing. 3(2): 15-21.
He T, Huang C, Blum B, Stankovic J, Abdelzaher T. (Sep. 2003) Range-free localization schemes for large scale sensor networks. 9$^{th}$ Annual International Conference on Mobile Computing and Networking (Mobicom 03).
Hu W, Tan T, Wang L, Maybank S. (Aug. 2004) A survey on visual surveillance of object motion and behaviors. IEEE Transactions on Systems. Man Cybernetics C, 34(3): 334-352.
Hubaux JP, Srivastava M. (2004) Proceedings of the Mobisys 2004 Workshop on Applications of Mobile Embedded Systems. Codeblue: Wireless sensor networks for medical care.
Intille S, Larson K, Tapia EM. (2003) Designing and evaluating technology for independent aging in home. International Conference on Aging, Disability and Independence.
Ivanov YA, Bobick AF. (2000) Recognition of visual activities and interactions by stochastic parsing. IEEE Trans. Pattern Anal. Mach. Intell., 22(8): 852-872.
Liao L, Fox D, Kautz H. (2004) Learning and inferring transportation routines. Proceedings of the 19$^{th}$ National Conference on Artificial Intelligence (AAAI).
Liao L, Fox D, Kautz H. (2005) Location-based activity recognition using relational markov models. Proceedings of the 19$^{th}$ International Joint Conference on Artificial Intelligence (IJCAI).
Liao L, Patterson DJ, Fox D, Kautz H. (2004) Behavior Recognition in Assisted Cognition. Proceedings of the AAAI Workshop on Supervisory Control of Learning and Adaptive Systems.
Liu J, Zhao F. (Oct. 2005) Towards semantic services for sensor-rich information systems. Proceedings of the 2$^{nd}$ IEEE/CreateNet International Workshop on Broadband Advanced Sensor Networks (BaseNets).
Lymberopoulos D, Barton-Sweeney A, Savvides A. (2005) Sensor localization and camera calibration using low resolution cameras. ENALAB 090501 Tech Report.
Lymberopoulos D, Ogale A, Savvides A, Aloimonos Y. (Apr. 2005) A sensory grammar for inferring behaviors in sensor networks. Proceedings of Information Processing in Sensor Networks, IPSN 2006.
Lymberopoulos D, Savvides A. (Apr. 2005) Xyz: A motion-enabled, power aware sensor node platform for distributed sensor network applications. Information Processing in Sensor Network (IPSN) SPOTS track.
Minnen D, Essa I, Stamer T. (2003) Expectation grammars: Leveraging high-level expectations for activity recognition. 2: 626.
Moore D, Essa I. (2001) Recognizing multitasked activities from video using stochastic context-free grammar. Proceedings of American Association for Artificial Intelligence.
Newton R, Arvind, Welsh M. (Apr. 2005) Building up to macroprogramming: An intermediate language for sensor networks. Proceedings of Information Processing in Sensor Networks (IPSN).
Ogale A, Karapurkar A, Aloimonos Y. (Oct. 2005) View-invariant modeling and recognition of human actions using grammars. Workshop on Dynamical Vision (ICCV-WDM).
PalChaudhuri S, Wagner R, Baraniuk RG, Johnson DV. COMPASS: An Adaptive Sensor Network Architecture for Multi-scale Communication.
Parameswaran V, Chellappa R. (2006) View invariance for human action recognition. International Journal of Computer Vision, 66(1): 83-101.
Parameswaren V, Chellappa R. (Sep. 2005) Human action-recognition using mutual invariants. Computer Vision and Image Understanding, 98(2): 294-324.
Park S, Aggarwal JK. (Aug. 2004) Event semantics in two-person interactions. Proceedings of the 17$^{th}$ International Conference on Pattern Recognition. ICPR, 4: 227-230.
Paskin AM, Guestrin CE, McFadden J. (Apr. 2005) A robust architecture for inference in sensor networks. Proceedings of the 4$^{th}$ International Symposium on Information Processing in Sensor Networks (IPSN05).
Patterson D, Fox MPD, Kautz H. (Oct. 2005) Fine-grained activity recognition by aggregating abstract object usage. IEEE International Symposium on Wearable Computers.
Patterson DJ, Liao L, Fox D, Kautz H. (2003) Inferring High-Level Behavior from Low-Level Sensors. Proceedings of UBICOMP 2003: 5$^{th}$ Annual Conference on Ubiquitous Computing (UBICOMP).
Philipose M, Fishkin KP, Perkowitz M, Patterson DJ, Fox, Kautz H, Hahnel D. (Oct. 2004) Inferring activities from interactions with objects. IEEE Pervasive Computing, 3(4): 50-57.
Polastre J. (2003) Design and implementation of wireless sensor networks for habitat monitoring. Master's thesis, University of California at Berkeley.

(56) References Cited

OTHER PUBLICATIONS

Rabiner LR. (Feb. 1989) A tutorial on hidden markov models and selected applications in speech recognition. Proceedings of the IEEE, 77(2): 257-286.
Schonfeld L. (2003) Behavior problems in assisted living facilities. J Applied Gerontology, 22(4): 490-505.
Shet V, Harwood D, Davis L. (2006) Multivalued default logic for identity maintenance in visual surveillance. $9^{th}$ European Conference on Computer Vision (ECCV).
Tapia EM, Intille SS, Larson K. (2004) Activity recognition in the home setting using simple and ubiquitous sensors. Proceedings of PERVASIVE 2004, LNCS 3001. Ferscha A and Mattern R (Eds). Berlin Heidleberg: Springer-Verlag, 2004, pp. 158-175.
Teixeira T, Culurciello E, Park E, Lymberopoulos D, Savvides A. (Apr. 2006) Address-event imagers for sensor networks: Evaluation and modeling. Proceedings of Information Processing in Sensor Networks, IPSN.
Tolle G, Polastre J, Szewczyk R, Turner N, Tu K, Burgess S, Gay D, Buonadonna P, Hong W, Dawson T, Culler D. (Oct. 2005) A macroscope in the redwoods. Proceeding of the $3^{rd}$ Conference on Embedded Networked Sensor Systems (SenSys).
Valera M, Velastin SA. (Apr. 2005) Intelligent distributed surveillance systems: a review. IEE Proceedings Visual Image Signal Processing,152(2): 192-204.
Vaswani N, Chellappa R. (2006) Principal component null space analysis for image and video classification. IEEE Transactions on Image Processing, 15(7): 1816-1830.
Vaswani N, Roy-Chowdhury AK, Chellappa R. (Oct. 2005) "Shape Activity": A Continuous State HMM for Moving/Deforming Shapes with Application to Abnormal Activity Detection. IEEE Transactions Image Processing, pp. 1603-1616.
Wang L, Hu W, Tan T. (Jan. 2003) Recent developments in human motion analysis. *Pattern recognition*, 36(3): 585-601.
Wetherell CS. (1980) Probabilistic languages: A review and some open questions. ACM Comput. Surv., 12(4): 361-379.
Whitehouse K, Liu J, Zhao F. (Feb. 2006) Semantic streams: A framework for the composable semantic interpretation of sensor data. Proceedings of the $3^{rd}$ European Workshop on Wireless Sensor Networks (EWSN).
Xu N, Rangwala S, Chintalapudi K, Ganesan D, Broad A, Govindan R, Estrin D. (Nov. 2004) A wireless sensor network for structural monitoring. Proceedings of the $2^{nd}$ International Conference on Embedded Networked Sensor Systems (SenSys), pp. 13-24.
Zimmerman S, Sloan PD, Willaims CS, Reed PS, Preisser JS, Eckert JK, Boustani M, Dobbs D. (2005) Dementia Care and Quality of Life in Assisted Living and Nursing Homes. Gerontologist, 45(1): 133-146.
Supplemental European Search Report for International Application No. PCT/US2007/066179 (dated Mar. 5, 2013).
C.G. Nevill-Manning et al.: "Compression by Induction of Hierarchical Grammars", Proceedings of IEEE Data Compression Conference (DCC 1994), Jan. 1, 1994, pp. 244-253.
Ivanov Yuri. A. et al.: "Recognition of Visual Activities and Interactions by Stochastic Parsing", Transactions on Pattern Analysis and Machine Intelligence, IEEE, Piscataway, USA, vol. 22, No. 8, Aug. 1, 2000.
Darnell Moore et al.: "Recognizing Multitasked Activities from Video Using Stochastic Context-Free Grammar", Proceeding Eighteenth National Conference on Artificial Intelligence, Jan. 1, 2002, pp. 770-776.
Lin Liao et al.: "Location-Based Activity Recognition Using Relational Markov Networks", Proceedings of the IJCAI '05 19th International Joint Conference on Artificial Intelligence, Jan. 1, 2005, pp. 773-778.
Dimitrious Lymberopoulos, et al.: "A Sensory Grammar for Inferring Behaviors in Sensor Networks", Information Processing in Sensor Networks, 2006. IPSN 2006. The Fifth International Conference on Nashville, TN, USA Apr. 19-21, 2006, Piscataway, NJ, USA, IEEE, Apr. 19, 2006, pp. 251-259.

\* cited by examiner

FRAMEWORK OF HIERARCHICAL SENSORY GRAMMARS FOR INFERRING BEHAVIORS USING DISTRIBUTED SENSORS

CROSS REFERENCE TO RELATED PATENT APPLICATIONS

This application claims priority to U.S. Provisional Application No. 60/790,343, filed Apr. 6, 2006; U.S. Provisional Application No. 60/790,672, filed Apr. 10, 2006; and U.S. Provisional Application No. 60/794,289, filed Apr. 21, 2006, all of which are herein incorporated by reference in their entireties.

SUMMARY

Provided herein are methods, systems, and apparatuses that can utilize a grammar hierarchy to parse out observable activities into a set of distinguishable actions. A grammar hierarchy can be, for example, a Probabilistic Context Free Grammar (PCFG). In an aspect, the hierarchical organization of grammars allows the use of one or more local sensor measurements for reasoning about more macroscopic behaviors. The methods, systems, and apparatuses provided can utilize a set of phonemes to construct grammars and can achieve distributed operation using a messaging model. The methods, systems, and apparatuses disclosed can be mapped to a network hierarchy or can be applied sequentially and across a network to infer behaviors as they unfold in space, time, or space and time.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods, systems, and apparatuses.

DETAILED DESCRIPTION

Before the present methods, systems, and apparatuses are disclosed and described, it is to be understood that the methods, systems, and apparatuses are not limited to specific synthetic methods, specific components, or to particular compositions, as such may, of course, vary. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

The present methods, systems, and apparatuses may be understood more readily by reference to the following detailed description of preferred embodiments and the Examples included therein and to the Figures and their previous and following description.

Provided herein are methods, systems, and apparatuses that can utilize a grammar hierarchy to parse out observable activities into a set of distinguishable actions. A grammar hierarchy can be, for example, a Probabilistic Context Free Grammar (PCFG). In an aspect, the hierarchical organization of grammars allows the use of one or more local sensor measurements for reasoning about more macroscopic behaviors. The methods, systems, and apparatuses provided can utilize a set of phonemes to construct grammars and can achieve distributed operation using a messaging model. In one aspect, the methods, systems, and apparatuses disclosed can be mapped to a network hierarchy or can be applied sequentially and across a network to infer behaviors as they unfold in space, time, or space and time.

At the lowest levels of the grammar hierarchy, a grammar can convert sensor measurements into a set of symbols that become the inputs of higher order grammars. Each grammar in the hierarchy can produces an output that interprets and summarizes its inputs and thus effectively reduces the data that need to be propagated to the higher layers. In a further aspect, computations are lightweight, training can be confined to the lowest layer of the hierarchy, and grammar hierarchies map can map naturally to network hierarchies.

I. EXEMPLARY SYSTEMS

Figure 1:
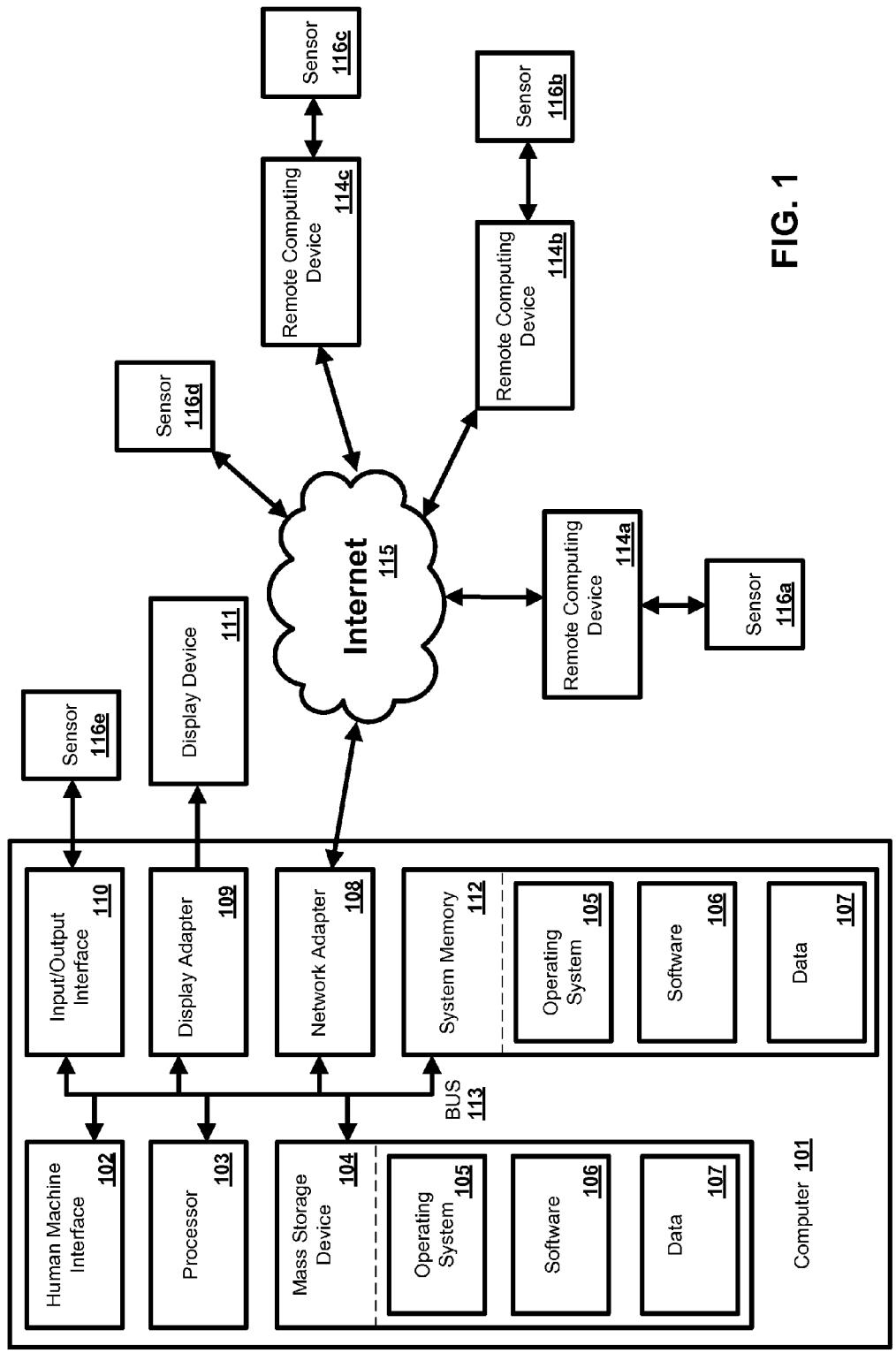
FIG. 1 is an exemplary operating environment.

FIG. 1 is a block diagram illustrating an exemplary operating environment for performing the disclosed method. This exemplary operating environment is only an example of an operating environment and is not intended to suggest any limitation as to the scope of use or functionality of operating environment architecture. One skilled in the art will appreciate that this is a functional description and that the respective functions can be performed by software, hardware, or a combination of software and hardware. Neither should the operating environment be interpreted as having any dependency or requirement relating to any one or combination of components illustrated in the exemplary operating environment.

The present methods, systems, and apparatuses can be operational with numerous other general purpose or special purpose computing system environments or configurations. Examples of well known computing systems, environments, and/or configurations that can be suitable for use with the system and method comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods, systems, and apparatuses can be performed by software components. The disclosed system and method can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed method can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the system and method disclosed herein can be implemented via a general-purpose computing device in the form of a computer 101. The components of the computer 101 can comprise, but are not limited to, one or more processors or processing units 103, a system memory 112, and a system bus 113 that couples various system components including the processor 103 to the system memory 112. In the case of multiple processing units 103, the system can utilize parallel computing.

The system bus 113 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI) bus also known as a Mezzanine bus. The bus 113, and all buses specified in this description can also be implemented over a wired or wireless network connection and each of the subsystems, including the processor 103, a mass storage device 104, an operating system 105, sensor software 106, sensor data 107, a network adapter 108, system memory 112, an Input/Output Interface 110, a display adapter 109, a display device 111, and a human machine interface 102, can be contained within one or more remote computing devices 114a,b,c at physically separate locations, connected through buses of this form, in effect implementing a fully distributed system.

The computer 101 typically comprises a variety of computer readable media. Exemplary readable media can be any available media that is accessible by the computer 101 and comprises, for example and not meant to be limiting, both volatile and non-volatile media, removable and non-removable media. The system memory 112 comprises computer readable media in the form of volatile memory, such as random access memory (RAM), and/or non-volatile memory, such as read only memory (ROM). The system memory 112 typically contains data such as sensor data 107 and/or program modules such as operating system 105 and sensor software 106 that are immediately accessible to and/or are presently operated on by the processing unit 103.

In another aspect, the computer 101 can also comprise other removable/non-removable, volatile/non-volatile computer storage media. By way of example, FIG. 1 illustrates a mass storage device 104 which can provide non-volatile storage of computer code, computer readable instructions, data structures, program modules, and other data for the computer 101. For example and not meant to be limiting, a mass storage device 104 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 104, including by way of example, an operating system 105 and sensor software 106. Each of the operating system 105 and sensor software 106 (or some combination thereof) can comprise elements of the programming and the sensor software 106. Sensor data 107 can also be stored on the mass storage device 104. Sensor data 107 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems. Sensor data 107 can comprise, but is not limited to, vector measurements, location measurements, sound measurements, time measurements, vibration measurements, contact measurements, heat measurements, light measurements, infrared measurements, and the like.

In another aspect, the user can enter commands and information into the computer 101 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 103 via a human machine interface 102 that is coupled to the system bus 113, but can be connected by other interface and bus structures, such as a parallel port, game port, an IEEE 1394 Port (also known as a Firewire port), a serial port, or a universal serial bus (USB).

In yet another aspect, a display device 111 can also be connected to the system bus 113 via an interface, such as a display adapter 109. It is contemplated that the computer 101 can have more than one display adapter 109 and the computer 101 can have more than one display device 111. For example, a display device can be a monitor, an LCD (Liquid Crystal Display), or a projector. In addition to the display device 111, other output peripheral devices can comprise components such as speakers (not shown) and a printer (not shown) which can be connected to the computer 101 via Input/Output Interface 110. sensor comprises a sensor network with at least one sensing modality.

One or more sensors 116*a,b,c,d,e* can communicate with the computer 101. In one aspect, sensor 116*e* can communicate with computer 101 through the input/output interface 110. This communication can be wired or wireless. Remote sensors 116*a,b,c* can communicate with computer 101 by communicating first with a respective remote computing device 114*1,b,c* which then communicates with computer 101 through the network adapter 108 via a network such as the Internet 115. Remote sensor 116*d* can communicate with computer 101 without the need for a remote computing device. Remote sensor 116*d* can communicate via a network, such as the Internet 115. The sensors 116*a,b,c,d,e* can communicate wireless or through a wired connection. The sensors 116*a,b,c,d,e* can communicate individual or collectively as part of a sensor network. The sensors 116*a,b,c,d,e* can comprise one or more sensing modalities. Examples of sensors 116*a,b,c,d,e* include, but are not limited to, a camera, a timer, a GPS, an infrared detector, a sound detector, a current sensor, a contact sensor, a pressure sensor, a passive infrared sensor, and the like. Sensors 116*a,b,c,d,e* can observe one or more targets.

The computer 101 can operate in a networked environment using logical connections to one or more remote computing devices 114*a,b,c*. By way of example, a remote computing device can be a personal computer, portable computer, a server, a router, a network computer, a peer device or other common network node, and so on. Logical connections between the computer 101 and a remote computing device 114*a,b,c* can be made via a local area network (LAN) and a general wide area network (WAN). Such network connections can be through a network adapter 108. A network adapter 108 can be implemented in both wired and wireless environments. Such networking environments are conventional and commonplace in offices, enterprise-wide computer networks, intranets, and the Internet 115.

For purposes of illustration, application programs and other executable program components such as the operating system 105 are illustrated herein as discrete blocks, although it is recognized that such programs and components reside at various times in different storage components of the computing device 101, and are executed by the data processor(s) of the computer. An implementation of sensor software 106 can be stored on or transmitted across some form of computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any method or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods, systems, and apparatuses can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g., genetic algorithms), swarm intelligence (e.g., ant algorithms), and hybrid intelligent systems (e.g., Expert inference rules generated through a neural network or production rules from statistical learning).

In one embodiment, provided is a middleware infrastructure that abstracts out node-level programming from a grammar developer and allows for a modular and flexible way of authoring and maintaining grammar hierarchies. In various embodiments, provided are methods, systems, and apparatuses for authoring of grammar hierarchies over deployed networks, the sustaining of grammars on sensor nodes and their interaction with the network hierarchies as well as the interactions of grammars and applications with spatio-temporal databases where event-driven inferences can be stored.

Figure 2:
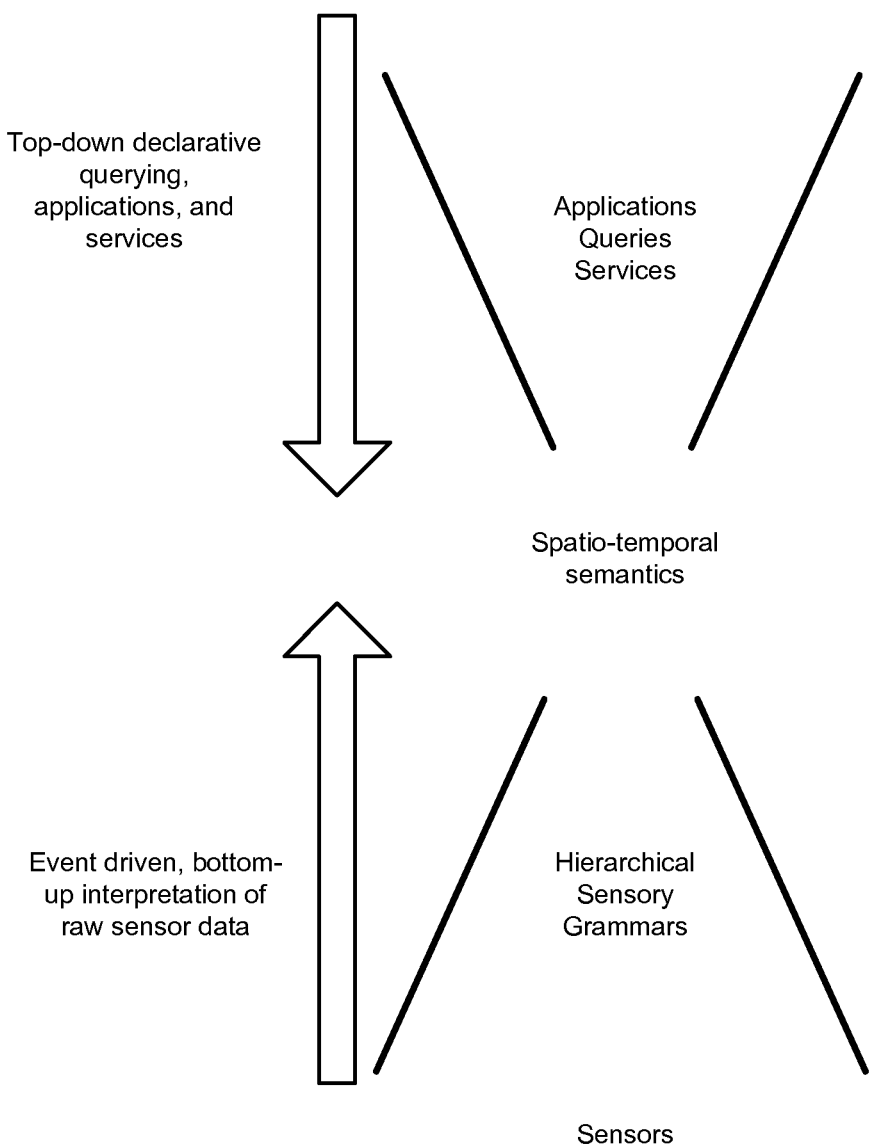
FIG. 2 illustrates a disclosed data processing paradigm and architectural component.

In a further embodiment, provided are methods, systems, and apparatuses that can utilize a data processing paradigm with favorable architectural implications for sensor networks by creating a new architectural component described in FIG. 2. Raw sensor measurements can be interpreted in a bottom-up manner to produce a set of higher-level semantics that can be consumed by applications. This provides a powerful means of reasoning on the raw sensor measurement data in a way that allows application developers to author applications using a higher-level interpretation of the data without worrying about the underlying sensing modalities and raw data.

Figure 3:
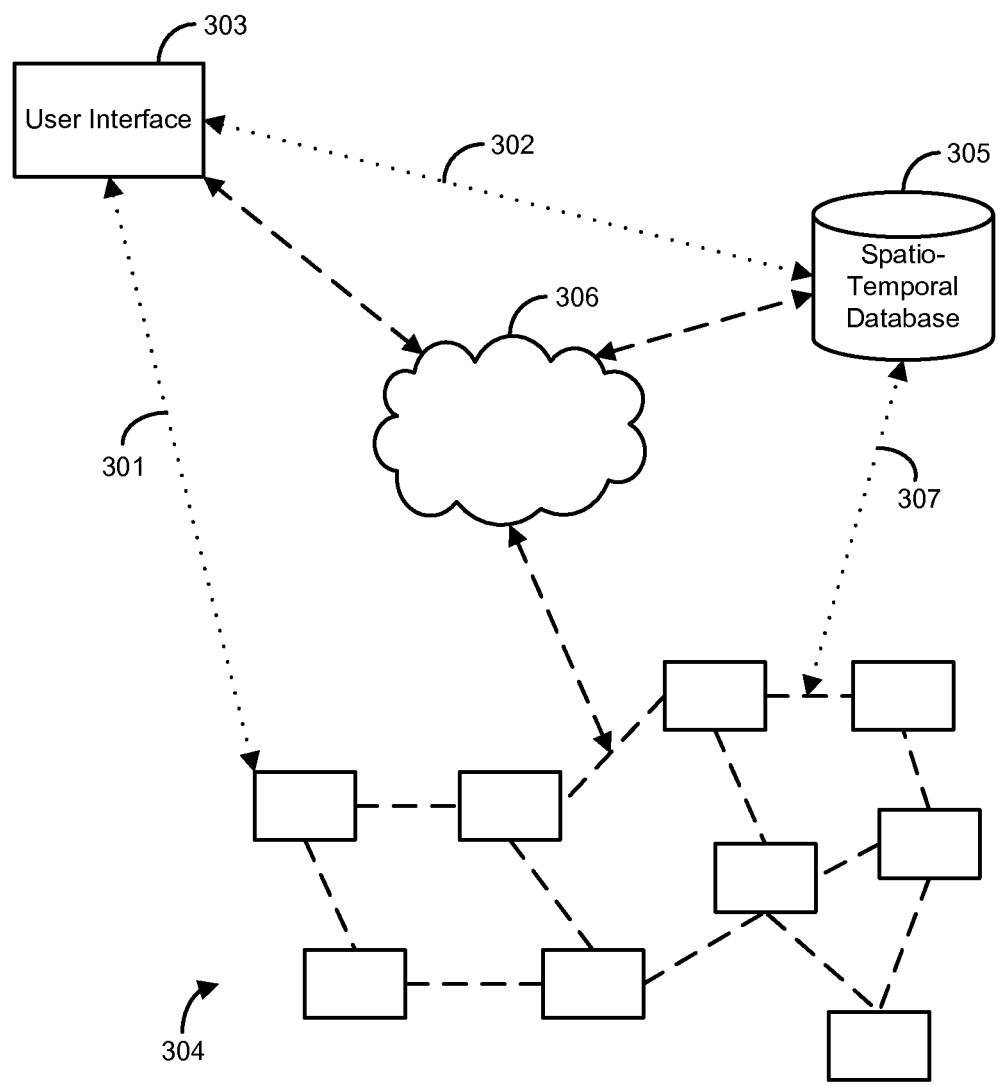
FIG. 3 illustrates paths of abstraction with the disclosed data processing paradigm.

This data processing paradigm leads to two distinct paths of abstractions, as shown in FIG. 3. The first path, 301, is a node-level abstraction that isolates the domain expert from low-level node programming. Through the node-level abstraction the domain expert is able to specify through a user interface 303 how sensor nodes in sensor network 304 process raw data to generate higher level semantics by providing high-level descriptions of grammars. The supporting middleware of the node-level abstraction automatically generates the required node-level code and installs it on the node. This expedites code development and problem space exploration by domain experts and results in a library of grammars that interpret raw sensor data into a set of semantics for applications to consume.

The second abstraction path, 302 is between the application developer and raw data stored in spatio-temporal database 305. This path allows the developers of applications and services to author plug-and-play applications through the user interface 303 that rely on semantics rather than sensor types and raw data. This promotes scalability by allowing applications to seamlessly operate over a heterogenous set of sensors in sensor network 304 and measurement interpretation mechanisms. Both paths of abstraction can utilize communication links through the network 306.

Path 307 indicates a probabilistic inference streams between the sensor network 304 and the spatio-temporal database 305.

Figure 4:
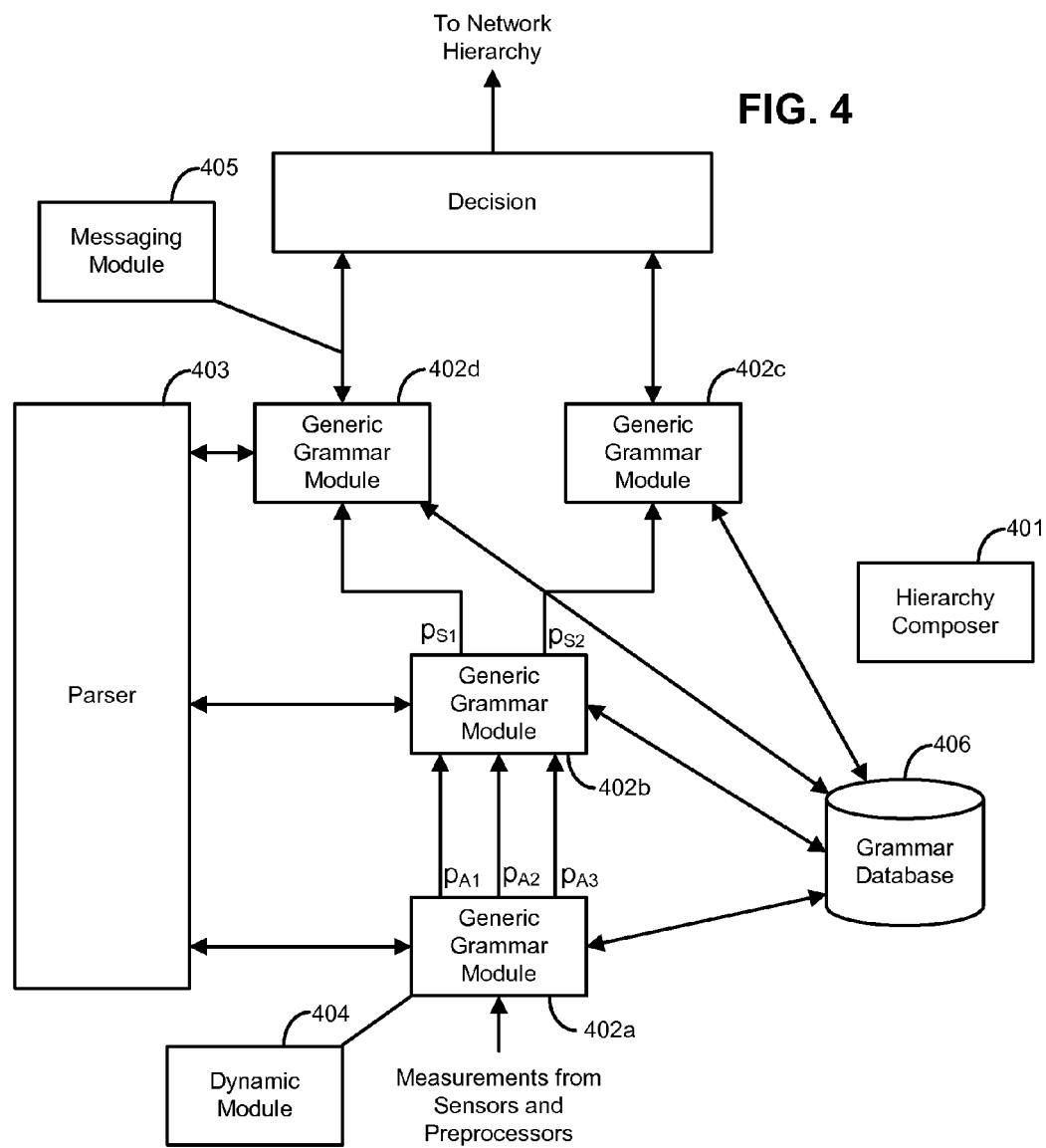
FIG. 4 illustrates an exemplary node configuration.

In one aspect, provided are mechanisms for updating and dynamically configuring grammar hierarchies in deployed networks. Exemplary components of a node-level implementation are described in FIG. 4. Node level mechanisms can operate on text messages to update a node's grammar definition repository 406 and grammar configuration. Text messages can be transmitted that contain grammar definitions and a set of configuration commands that describe how the grammar hierarchy should be assembled. At the node level, a hierarchy composer 401 can create the required hierarchy by replicating a pre-compiled generic grammar wrapper module. The hierarchy composer can stack up the generic wrapper modules into a hierarchy and initialize each one to point to the grammar definition it is supposed to execute. As soon as a generic grammar module 402a,b,c,d receives the data from the generic grammar module underneath, it can invoke the parser module 403 and pass it the new data it received together with its grammar descriptions. The parser 403 can parse the data according to the grammar, and pass the outputs back to the generic grammar module that will pass the data to the next level of subscribed generic grammar modules. The hierarchy composer 401 can also connect the generic grammar modules together by routing the input and output streams from one module to the next using the messaging infrastructure of the underlying operating system. This approach can easily assemble stacks of modules without the need of compiling new binary programs and by efficiently utilizing the services of the underlying node operating system to do messaging, buffering and state tracking. By way of example, this method can be implemented in the SOS operating system using dynamic modules 404 and intermodule messaging 405. Dynamic modules 404 can implicitly allocate and maintain the state of each module in the hierarchy, while the messaging system 405 can provide a queuing mechanism for storing the intermediate results between modules (grammars) in the hierarchy. For a wireless re-programming approach this has the advantage that it can transmit text definitions of grammars and configurations and optionally compressing them. By avoiding the installation of new binary code on a running node this also reduces program crashes, therefore enhancing system safety.

This mechanism can reduce programming time at the node level. In one aspect, this mechanism can allow researchers working in the signals and system part of sensor networks to use these platforms by enabling scriptable programming that focuses on signal processing (e.g., enabling one to easily deploy MATLAB type algorithms on sensor nodes). The disclosed methods, systems, and apparatuses can provide a modular stack of inference engines that can be easily modified at runtime because the inference engine can be constructed from a parser (binary) and set of grammar definitions (text). In this aspect, the inference system can operate on a set of text rules that can be rapidly modified and reconfigured and can support multiple types of inferences from the same underlying sensor data.

In another aspect, provided is a tool for writing grammars and organizing hierarchies using a flowchart approach. A programmer can enter the grammar definitions and wire them together using a block-diagram representation. This tool can generate a grammar configuration file that describes how to augment an existing grammar or structure a new grammar inside the network. The same tool can query the nodes on the network for their grammar configurations.

The provided methods, systems, and apparatuses can integrate and interact with existing sensor network components. An exemplary programming language that can be used to implement the methods, systems, and apparatuses provided includes the Regiment functional macroprogramming language. Regiment can use a data model based on the concept of region streams, which represent spatially distributed, time-varying collections of node state. The node state corresponds to a specific signal or a sensor value that is associated to the node. The programmer uses these node states to express interest in a group of nodes with some geographic, logical, or topological relationship. The corresponding region stream represents the set of sensor values across the nodes in question. From this perspective, the sensor network can be seen as a collection of signals or sensor values that become the blocks of the high level macroprogramming language. Typically, the bottleneck in such an implementation is the fact that the high level macroprogramming interface has to be mapped all the way to low level sensor signals on the node level. Regiment tries to abstract this low level information by adding one more functional programming model on the node level. Alternatively, Regiment could use the already interpreted semantic outputs of sensory grammars instead of signals. This will effectively transform the sensor network from a collection of low level signals to a more powerful collection of semantics that the macroprogramming environment is much easier to be mapped to.

In Regiment, the operations permitted on region streams include fold, which aggregates values across nodes in the region to a particular anchor, and map, which applies a function over all values within a single region stream. In the case of the semantics produced by the proposed hierarchy of grammars, the fold operation would correspond to the distributed implementation of a hierarchy of grammars. Nodes in a specific region are combining their local observations and findings to produce higher level semantic descriptions and services at the network level. The aggregation of low level signals would thus correspond to the network level parsing of raw sensor data. This one-to-one correspondence demonstrates that a distributed grammar hierarchy could be built on top of the unified abstraction for communication, execution and network state management that is based on distributed token machines

II. EXEMPLARY METHODS

In one embodiment, the methods, systems, and apparatuses provided can utilize a grammatical structure to compose a description of what is happening in physical space from low-level sensor measurements. Instead of communicating raw sensor data to the clusterhead or base-station, the proposed framework can create a modularized stack of probabilistic context free grammars (PCFGs), that bears similarities to languages. Sensor measurements can be fed to the lowest level grammar (Level 0) that will convert them into a set of phonemes for the defined sensor language. These phonemes can be interpreted into actions (or verbs), sentences, paragraphs and stories by passing through a set of higher order grammars in the hierarchy. After passing through a few grammar levels at the sensor node level the raw data measurements can be converted into a set of higher level representations of beliefs about a particular set of actions. In various aspect, this interpretation process can continue at the network level in two different directions, horizontally and vertically. Horizontal communication can take place if the entity of interest moves from the coverage area of one sensor node to the coverage area of a neighboring sensor node. The two nodes can perform a handoff to transfer the computation state (i.e., a set of probabilities for each grammar output) to the new node that observes the entity. Vertical communication can pass the local inferences to nodes (or basestations) to continue the inference over a larger spatial and temporal extent. For example, a set of smaller nodes can pass their level 0 results to a central server, and the central server can continue executing more complex grammars to interpret the results.

A. Parsing Behaviors in Sensor Networks

The need for recognizing behaviors comes at all levels of a sensor network hierarchy during a data collection process. In many applications, it is more practical to filter out redundant information as close to the sensors as possible so as to reduce the computation and communication requirements across the network. At the same time, the sensed information can be interpreted so that the network can understand what is happening in the physical world and provide a response. For example, camera sensors can provide qualitatively and quantitatively better information about a scene. Communicating and processing images across the network however is an expensive process requiring significant communication and processing bandwidth. In one aspect, it is contemplated that the image information is processed locally at a node level. Nodes in the network can then interpret a behavior by exchanging short packets containing symbolic information about their sensors.

Figure 5:
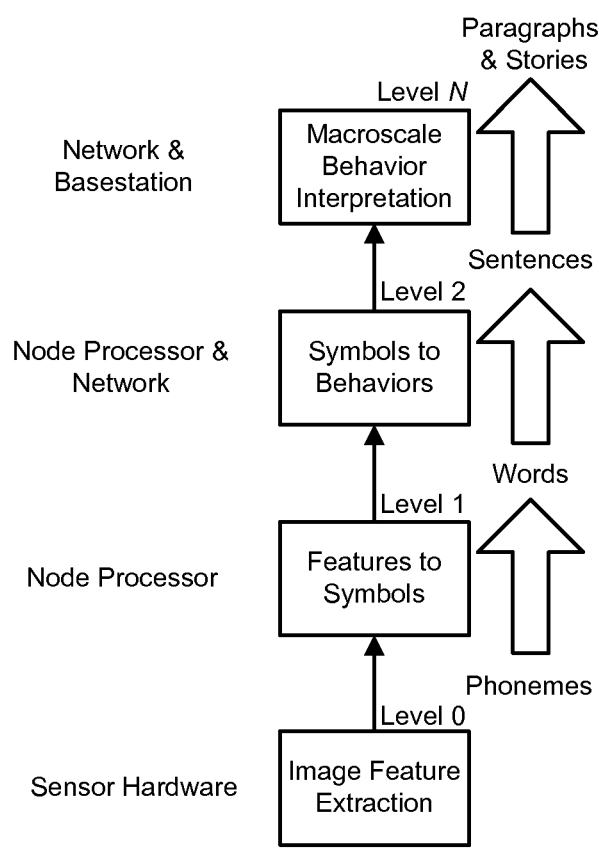
FIG. 5 illustrates a modularized stack created by the disclosed methods.

In one aspect, the methods, systems, and apparatuses can create a modularized stack, as shown in FIG. 5, which bears similarities to languages. Intelligent sensors at the physical layer can extract a set of features from the environment that are analogous to phonemes in natural language (Level 0). These phonemes can be interpreted into actions (or verbs), sentences, paragraphs and stories that describe the happenings inside the sensor network (Level 1 up to Level N). This framework can be applied sequentially and across the network to interpret behaviors that unfold in space and time.

i. Defining and Identifying Behaviors

Figure 6:
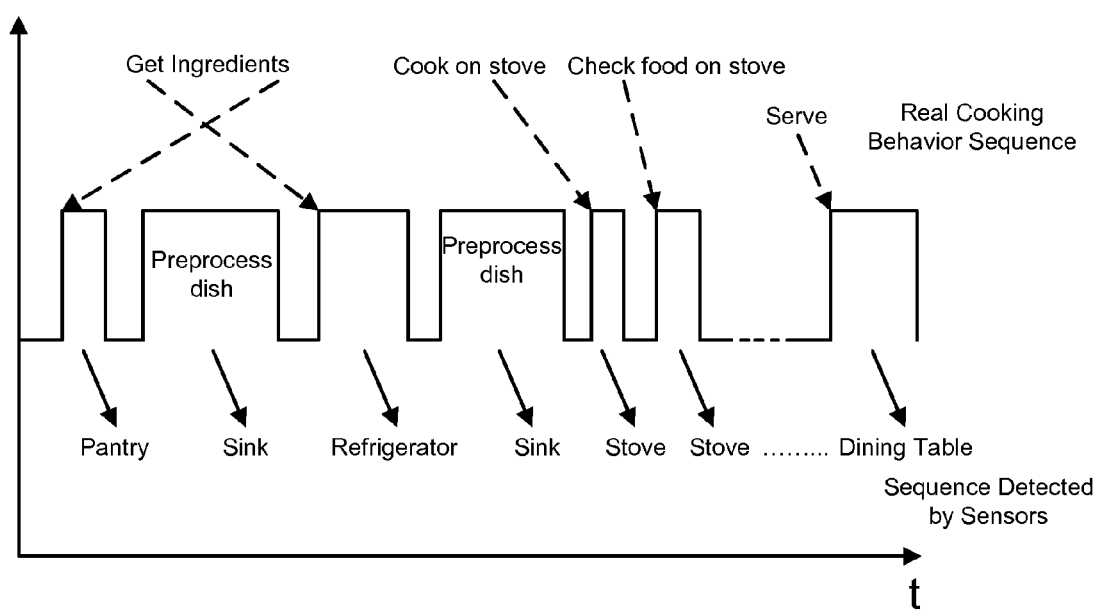
FIG. 6 is a digital waveform representation of cooking behavior.

Behaviors can be considered sequences of actions that take place in space and time. These sequences can be observed using distributed sensors and interpreted using a hierarchy of probabilistic grammars. For example, a subject's location in time can be correlated with a set of predefined areas in to approximate the sequence of actions that take place during a particular behavior. In one aspect, the sequence of actions can be viewed as a digital waveform in time, an example of which is shown in FIG. 6 that illustrates a sequence of action associated with cooking. In this example, this can be approximated by observing a sequence of places visited during cooking using, for example, a small camera. A time series of locations can be obtained by recording the centroid of motion of a subject moving in the kitchen. The observation of the aforementioned sequences can be performed by many other sensing technologies, homogeneous or heterogeneous depending on the spatial scale and required sensing resolution. In a kitchen for example, all items could be exhaustively tagged with RFID tags and other contact sensors. On a larger scale and outdoor scenarios, sequences could be collected by GPS or other terrestrial localization systems. The sensors used in the disclosed methods, systems, and apparatuses can be utilized so as to approximately capture action sequences. These sequences can be treated as a digital waveform in time and probabilistic grammars can be used to interpret them.

In a further aspect, a hierarchy of Probabilistic Context Free Grammars (PCFGs) can be used to interpret the sequences. The syntactic power of grammars provides a flexible and powerful tool for accurately describing and reasoning about behavior. Each production rule of a PCFG is associated with a probability that is internally used by a parser applying the grammar to resolve ambiguities by selecting the most probable parse string of the observed sequences. The operation of PCFGs is very similar (and often interchangeable) with Hidden Markov Models (HMMs) used in speech processing and handwriting recognition. Once defined, each grammar specification can be viewed as a black box with well specified inputs and outputs. Advantages of a hierarchy of grammars include behavior independent training by confining training to the lowest layers of the hierarchy. It is contemplated that one could train the sensors or the lower layer of the hierarchy and then use the outputs to create multiple hierarchies that provide different interpretations of the same data without exhaustively training the entire system for all new behaviors. Another advantage is that by splitting grammars into smaller modules computational complexity is reduced so that parsing can be performed by small sensor nodes. Another advantage is that the hierarchy allows for modularity and the creation of powerful architectural abstractions.

Similar functionality could be achieved using Hidden Markov Models instead of PCFGs. PCFGs however are more general and more expressive and can be used to describe a large family of HMMs. Using a small set of simple grammar rules families of HMMs can be defined, where each family models similar motion behaviors. This representation does not only reduce memory requirements but also makes the reconfiguration of the sensor network easier and more efficient. Instead of changing the definition of a large number of HMMs, in order to detect different type of motion behaviors, a small set of rules can be changed on each node. This small set of rules can captures the same information as a large number of HMMs.

An important aspect in collecting sequences for behavior interpretation of humans is the consideration of the sources of error. An important error component rises from the fact that humans tend to multi-task a lot. In terms of the exemplary digital waveform of FIG. 6, this means that sequences for various activities overlap in time. A sequence observed during cooking for instance may also include actions such as talking on the phone, watching TV or going to the bathroom. Another source of error arises from the fact that in many situations sensor observations are not 100% accurate. In a cooking activity example, passing from one of the areas of interest without performing an expected activity results in false positives, while a missed detection of a person in a specific area results in false negatives.

ii. Challenges in Parsing Behaviors

The lack of global information on individual sensor nodes makes the problem of training a sensor network to parse macro-behaviors extremely challenging: In particular, the training of the sensor network should be Topology/Location independent and scaling independent.

Topology/Location independent: The detection and recognition of behaviors is independent of the location in the network where the behavior takes place. Therefore, the training data for such a sensor network should not embed any location or topology information.

Scaling independent: The detection and recognition of a behavior is independent of the scale of the behavior.

For example, consider a sensor network that recognizes people moving on a circle in a room. The Topology/Location independence rule implies that the "moving on a circle" behavior is the same independently of the location in the room where it is performed. "Moving on a circle" close to the exit of the room is the same as "moving on a circle" in the middle of the room. The scaling independence rule implies that the "moving on a circle" behavior is independent of the actual size of the circle. The motion pattern of a human moving on a circle of 1 m radius is the same as the motion pattern of a human moving on a circle of 5 m radius.

The Topology/Location independence and scaling independence should be enforced during the training of a sensor network for two main reasons:

Size of the training data: Differentiating among the same behaviors that take place at different locations in the network or among behaviors that appear at different scales, would create a huge training data set.

Network scalability: This huge training data set would also depend on the topology and the size of the network affecting the flexibility and scalability of the network. If a number of nodes dies or a number of nodes is added to the network, the topology and relative locations of the nodes automatically change, dictating the partial re-training of the sensor network.

To avoid running into scalability issues, the disclosed methods, systems, and apparatuses simplify the extent of training required by the sensor network by adopting a hierarchy of grammars. Instead of training the network for all behaviors, the framework can be structured so as to simplify and reduce the amount of required training. The grammar at the bottom of the hierarchy operates directly on the sensor measurements and can convert them into a more symbolic form that becomes the input for higher order grammars. This structure not only reduces the amount of training required but also facilitates the interaction of multiple sensing modalities at the higher levels of the hierarchy. The methods, systems, and apparatuses can utilize a Level-0 grammar that can convert sensor measurements into a more symbolic form, and then can use the outputs of multiple Level-0 grammars that represent multiple sensing modalities as inputs to higher level grammars that reason about behaviors.

By way of example, the methods, systems, and apparatuses are presented in the context of tracking applications using a trace of location data (a time series of location measurements) extracted from a camera sensor network. However, any type of sensor measurement can be used with the methods, systems, and apparatuses provided. The network of sensors can be configured to generate a stream of locations when observing a target moving along the sensor field. By way of example, the methods, systems, and apparatuses are presented with the use of such tracking data to parse the motions of a target into lines, left and right turns, U-turns and S-turns.

iii. Identifying the Phonemes

In one aspect, phonemes can be a fundamental component of the methods, systems, and apparatuses. A network designer must know the desired application well enough to specify a set of terminal symbols for a language (phonemes). These phonemes can be specified in a way that allows their use at the node and sensor level. The sensor can be intelligent enough to output features that can be used as phonemes. For example, a Level-0 grammar can be embedded in sensor node hardware. In another aspect, a sensor node processor can interpret raw sensor data as phonemes. By confining as much as possible the production of phonemes to a Level-0 grammar, the training requirements can be confined to the sensor node level. Once the phonemes are successfully extracted, the rest of the network can interpret complex behaviors by operating on a vocabulary generated at each level of the hierarchy.

In human language recognition, speech processing operates on language phonemes. In computer vision, these terminal visions can be the key frames extracted from a sequence of images observing and action. These key frames are the minima and maxima points in motion behaviors that are sufficient to describe a behavior. Handwriting recognition approaches use direction, angle or velocity information. By way of example, phonemes can be straight lines inferred from a set of direction vectors extracted from a camera sensor.

iv. Specifying the PCFG

A context-free grammar G is an ordered quadruple ($V_N$, $V_T$, Start, Pr) where:

$V_N$ is an alphabet of non-terminal symbols.

$V_T$ is an alphabet of terminal symbols.

$V_N \cap V_T = \emptyset$. $V = V_N \cup V_T$ is called the vocabulary.

Start $\in V_N$ is the start symbol.

Pr is a finite nonempty subset of $V_N \times V^*$ called the production rules.

The set of all strings that are composed of non-terminal, terminal or both non-terminal and terminal symbols are represented by $V_N^*$, $V_T^*$, and $V^*$ respectively. Let capital letters: A, B, C, . . . represent the non-terminal symbols and small letters: a, b, c, . . . , represent the terminal symbols. The production rules of a context-free grammar are then written as: A→a, where the left-hand side can be any non-terminal symbol while the right-hand side can be any combination of terminal and non-terminal symbols.

Starting from the start symbol Start and by successively applying the same or different production rules, different strings can be generated. In general, string a derives string $\beta$ ($\alpha \Rightarrow \beta$) if there is a sequence: $\alpha = \alpha_0, \alpha_1, \alpha_2, \ldots, \alpha_n = \beta$, $n \geq 0$, of strings in $V^*$ such that: $\alpha_0 \Rightarrow \alpha_1, \alpha_1 \Rightarrow \alpha_2, \ldots, \alpha_{n-1} \Rightarrow \alpha_n$. The language L(G) generated by a context-free grammar G is the set:

L(G)={x|Start$\Rightarrow$ x, x$\in V_T^*$}. In other words, L(G) is the set of all terminal strings derivable from the start symbol Start.

Having defined in detail the context-free grammars (CFG), a probabilistic context-free grammar PG can be described as a CFG paired with a set of probabilities P={$P_{ij}$}. This set of probabilities must satisfy the following rules:

1) For each production $P_{ij} \in P_r$ there is one and only one probability $p_{ij} \in P$.
2) $0 < p_{ij} \leq 1$, $\forall i,j$
3) For every i with $1 \leq i \leq |V_N|$ $\Sigma_{1 \leq j < n_i} p_{ij} = 1$, where $n_i$ is the number of productions with the ith non-terminal on the left-hand side.

This definition assigns a constant probability to each production rule in grammar G. These production probabilities can be used to generate probabilities for sentences. The basic assumption is that the choice of production rules used in deriving a sentence is "context-free" in the sense that each rule is chosen independently of all the others in the derivation. This allows computation of the probability of a sentence as the product of the production probabilities that were used to generate this sentence. If the same sentence can be derived in more than one ways then its probability is the sum of the probabilities of all possible derivations.

v. Hierarchical Grammar Construction

In one aspect, a versatile feature of the method and systems is the ability to create a hierarchical grammar. At Level-0, the symbols (phonemes) in the vocabulary of the PCFG are obtained from the sensors, and the probabilities $p_u$ for each symbol can be obtained by off-line training. When a sensor measurement is obtained, the Level-0 grammar can use the sensor measurement to update the probability for each production (behavior). These outputs can become the vocabulary for grammars in the subsequent levels of the grammar hierarchy. In this way each level of the hierarchy computes a set of probabilities for each behavior it describes. The lower levels of the hierarchy can infer simple behaviors that help higher levels infer macro-behaviors.

Figure 7:
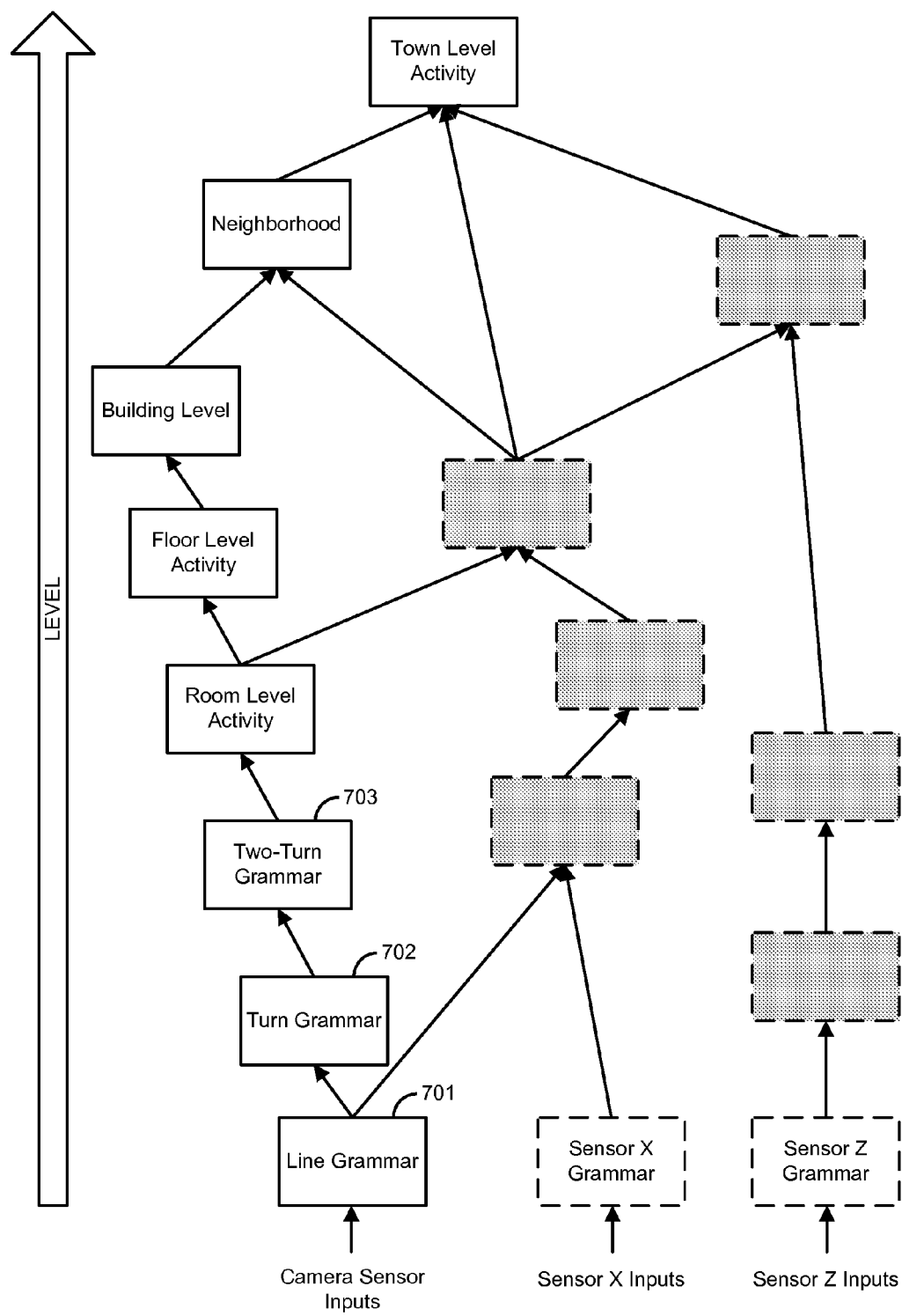
FIG. 7 is an exemplary grammar hierarchy.

Consider the exemplary grammar hierarchy in FIG. 7. The first three levels (blocks 701-703) describe a hierarchy defined in detail the Examples section below. By way of example, Level-0 (block 701) processes inputs from cameras to infer probabilities for four types of straight lines, pointing north, south, east and west. The outputs of Level-0 become the terminal symbols for Level-1 (block 702), which classifies the line behavior to left, right and 180-degree turns. A Level-2 (block 703) grammar then operates on the outputs of Level-1 to infer another set of probabilities for S-turns and U-turns. A higher level grammar can detect zig-zag and spirals, which can provide inputs to yet another grammar to infer what a person does at the room level (i.e., walking in circles, dancing, etc. . . . ). Similarly, one could expand the hierarchy horizontally, by including more sensing modalities, or vertically to infer activities in a room, floor, building, neighborhood, and town.

Each level of the hierarchy can interpret the output of the previous level and summarize the information into a higher order behavior. Through such a hierarchy, measurements can be correlated from a local scale to infer a behavior that takes place at a more macroscopic level. When mapped onto a network hierarchy, a grammar hierarchy can honor a very desirable attribute for communication in sensor networks. Each grammar level can interpret information and produce outputs in more compact form, which reduces the amount of data that needs to be propagated across the network hierarchy according to the messaging model of the disclosed methods, systems, and apparatuses.

B. Messaging Model

In one aspect, provided is a messaging model that can specify how information flows across a grammar hierarchy, and between nodes in the network. To describe the messaging model, consider two neighboring nodes A and B with adjacent, non-overlapping sensing regions observing a target moving across the sensing region of A and into the sensing region of B. Each node runs an instance of the exemplary three-level grammar hierarchy described in blocks 701-703 of FIG. 7. Every time there is a new observation, the node that made the observation can update the probabilities of detection for all the behaviors at all the levels of its grammar hierarchy.

When the target moves out of the sensing range of node A into the sensing range of node B, node A can transmit its update probabilities to node B to continue the computation. In particular, given a PCFG G and a string $w_1, w_2, \ldots w_n$ the most probable parse tree in the grammar for the given string can be found:

$$\text{argmax}_{tree} P(tree | w_1 \ldots w_n, G) \tag{1}$$

Note that the maximization problem in the last equation is a global maximization problem since information about the whole string is required. However, in the case of a distributed sensor network, nodes make local observations and they are not aware of the observations made at other nodes. This means that each node can observe only a substring of $w_1, w_2, \ldots w_n$ at different places in space and time. Consequently, such a global maximization would be feasible only if all nodes were communicating their local observations to a central node, where the actual maximization problem could be solved.

The global maximization problem in equation 1 can be decomposed to a set of local maximization problems. This can de done using a dynamic programming algorithm called the Viterbi search path algorithm. Given the PCFG G and the string $w_1, w_2, \ldots w_n$ the most probable derivation tree of the given string can be found. Let V[X, i, j] be the maximum probability of any single derivation of the string $w_i \ldots w_{j-1}$ from the non terminal symbol X. Then, in normal Chomsky form $\forall j > i+1$:

$$V[X,i,i+1] = P(X \to w_i) \tag{2}$$

$$V[X,i,j] = \max_{X \to YZ}{}^{i<k<j} P(X \to YZ) V[Y,i,k] V[Z,k,j] \tag{3}$$

The last set of equations shows that the initial global maximization problem can be decomposed to a sequence of local maximization problems. This means that the sensor node that makes the $k^{th}$ observation (node B in the previous example) needs to run a local maximization problem based on:

1) its local observation
2) all the possible production rules of the grammar based on its local observation
3) the result of the local maximization on the sensor node that made the k−1 observation (node A in the previous example).

Note that the only non-local information needed by the node that makes the $k^{th}$ observation is the result of the maximization on the sensor node that made the k−1 observation. In addition, all the local maximizations performed for the observations 1, 2, . . . , k−2 are not needed at step k because all this information is already embedded in the maximization performed at the k−1 step. Note that the actual amount of data that needs to be transmitted to the node that computes step k is very small. For example, the three level grammar described in blocks 701-703 of FIG. 7, computes three probabilities at each level. Assuming that each probability is stored in a 16-bit variable, then each transition of a target from the sensing region of one node to the sensing region of another node will result in the transmission of a packet carrying 18 bytes of state data. In this aspect, it contemplated that the packet transmission can be triggered by an external handoff process that recognizes the transition of the target from one region to the next.

C. Exemplary Implementations

Figure 8:
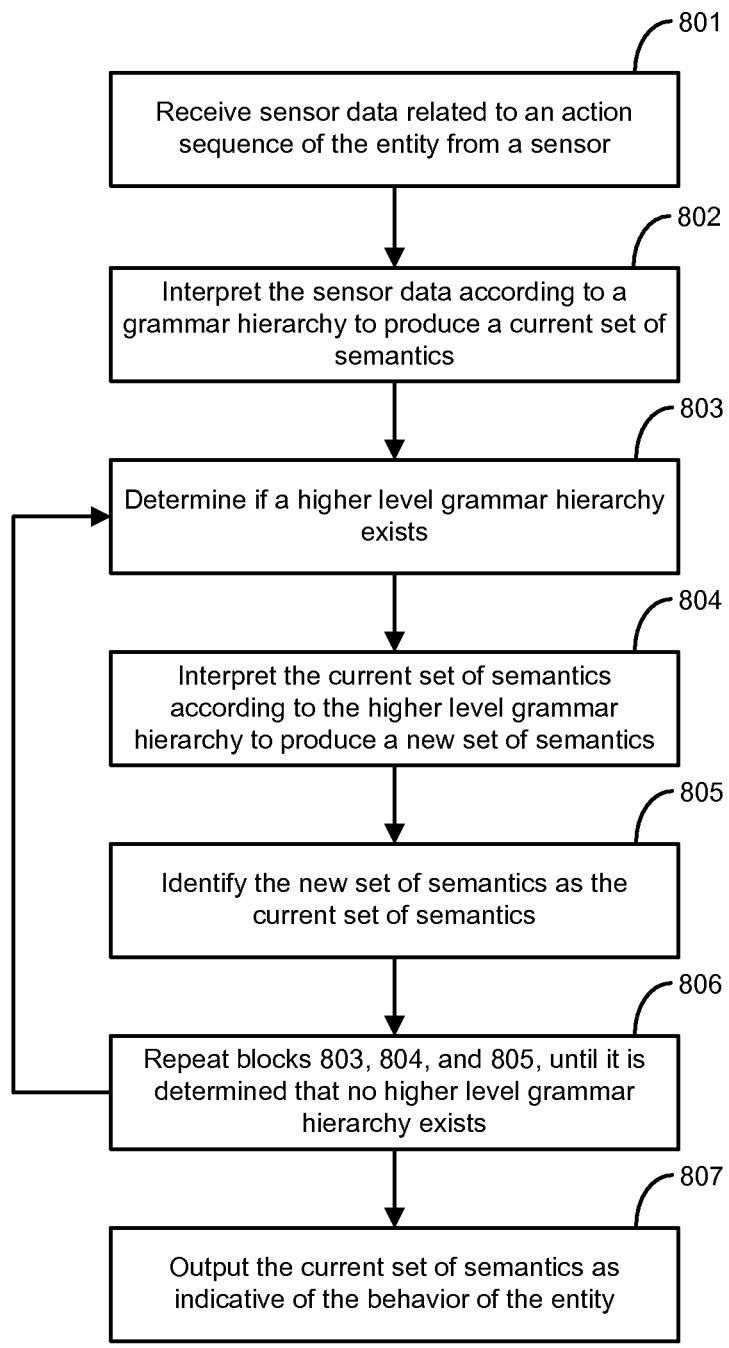
FIG. 8 is a flowchart illustrating an exemplary method.

In one exemplary embodiment, illustrated in FIG. 8, provided are methods for identifying a behavior of an entity, comprising receiving sensor data related to an action sequence of the entity from a sensor at block 801, interpreting the sensor data according to a grammar hierarchy to produce a current set of semantics at block 802, determining if a higher level grammar hierarchy exists at block 803, interpreting the current set of semantics according to the higher level grammar hierarchy to produce a new set of semantics at block 804, identifying the new set of semantics as the current set of semantics at block 805, repeating blocks 803, 804, and 805 until it is determined that no higher level grammar hierarchy exists at block 806, and outputting the current set of semantics as indicative of the behavior of the entity at block 807.

The sensor can comprise a sensor network with at least one sensing modality. The sensor data can be related to a spatial position of the entity, a time that the entity is at the spatial position, or both. The grammar hierarchies can comprise hierarchies of probabilistic context free grammars. The probabilistic context free grammars can comprise spatial hierarchies, spatio-temporal hierarchies, or both.

In one aspect, the step of interpreting the sensor data according to the grammar hierarchy to produce a new set of semantics can comprise assembling the sensor data into a sequence sensor measurements, converting the sequence of sensor measurements to a sequence of phonemes, converting the sequence of phonemes into a plurality of sequences of behaviors, computing a sequence probability for each sequence of behaviors based on a probability associated with each behavior, and selecting the sequence of behaviors with the highest sequence probability as the new set of semantics.

In another aspect, the step of interpreting the sensor data according to the grammar hierarchy to produce a new set of semantics can comprise assembling the sensor data into a sequence of sensor measurements and times, converting the sequence of sensor measurements and times into a plurality of sequences of time durations at spatial positions, computing a sequence probability for each sequence of time durations at spatial positions based on a probability associated with each duration of time at a spatial position, and selecting the sequence of durations of times at spatial positions with the highest sequence probability as the new set of semantics.

Repeating blocks 803, 804, and 805 can comprise converting the current set of semantics into a plurality of sequences of sub-behaviors, computing a sequence probability for each sequence of sub-behaviors based on a probability associated with each sub-behavior, and selecting the sequence of sub-behaviors with the highest sequence probability as the new set of semantics.

Figure 9:
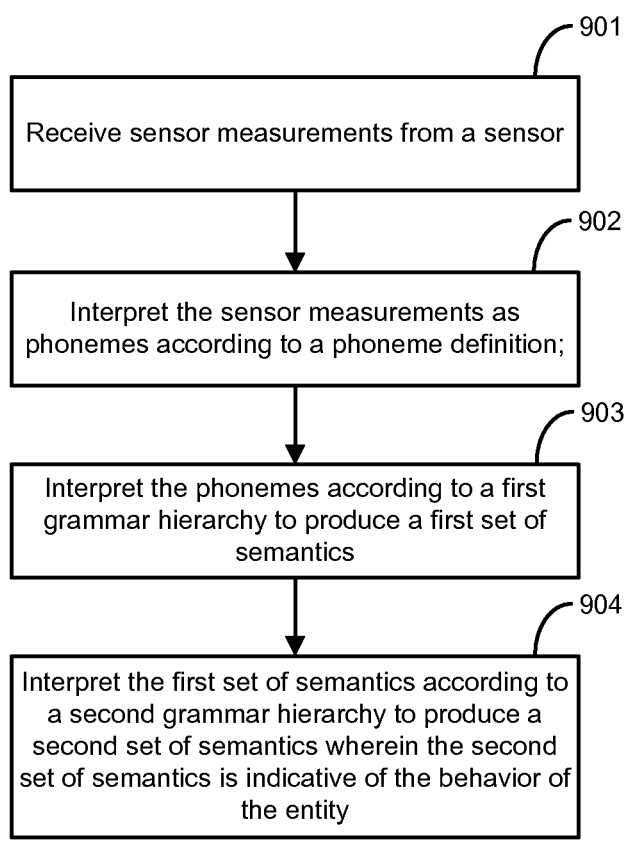
FIG. 9 is a flowchart illustrating an exemplary method.

In yet another aspect, illustrated in FIG. 9, provided are methods for determining a behavior of an entity, comprising receiving sensor measurements from a sensor at block 901, interpreting the sensor measurements as phonemes according to a phoneme definition at block 902, interpreting the phonemes according to a first grammar hierarchy to produce a first set of semantics at block 903, and interpreting the first set of semantics according to a second grammar hierarchy to produce a second set of semantics wherein the second set of semantics is indicative of the behavior of the entity at block 904.

The sensor measurements can be related to a spatial position or context of an entity of an entity and wherein a plurality of spatial positions has been predefined.

The first grammar hierarchy and the second grammar hierarchy can be comprised of hierarchies of probabilistic context free grammars. The first grammar hierarchy can comprise a plurality of behaviors associated with the plurality of spatial positions.

In this aspect, the step of interpreting the sensor measurements according to the first grammar hierarchy to produce a first set of semantics can comprise assembling the sensor measurements into a sequence of phonemes, converting the sequence of phonemes into a plurality of sequences of behaviors, computing a sequence probability for each sequence of behaviors based on a probability associated with each behavior, and selecting the sequence of behaviors with the highest sequence probability as the first set of semantics.

The first grammar hierarchy can further comprise a plurality of exceptions. The methods can further comprise filtering an exception from the first set of semantics, thus preventing the first set of semantics from comprising the exception and triggering an action based on the exception. For example, if an entity is detected leaving an area, an action can be triggered that activates a secondary sensor network, notifies another entity, and the like.

The second grammar hierarchy can comprise a plurality of sub-behaviors associated with the plurality of behaviors. The step of interpreting the first set of semantics according to the second grammar hierarchy to produce a second set of semantics can comprise converting the first set of semantics into a plurality of sequences of sub-behaviors, computing a sequence probability for each sequence of sub-behaviors based on a probability associated with each sub-behavior, and selecting the sequence of sub-behaviors with the highest sequence probability as the second set of semantics.

The sensor measurements can further comprise data related to a time the entity is at a position. The first grammar hierarchy can comprise a plurality of time durations associated with the plurality of spatial positions. The step of interpreting the sensor measurements according to the first grammar hierarchy to produce a first set of semantics can comprise assembling the sensor measurements into a sequence of spatial positions and times, converting the sequence of spatial positions and times into a plurality of sequences of time durations at spatial positions, computing a sequence probability for each sequence of time durations at spatial positions based on a probability associated with each duration of time at a spatial position, and selecting the sequence of time durations at spatial positions with the highest sequence probability as the first set of semantics.

The second grammar hierarchy can comprise a plurality of behaviors associated with the plurality of time durations associated with the plurality of spatial positions. The step of interpreting the first set of semantics according to the second grammar hierarchy to produce a second set of semantics can comprise converting the first set of semantics into a plurality of sequences of behaviors, computing a sequence probability for each sequence of behaviors based on a probability associated with each behavior, and selecting the sequence of behaviors with the highest sequence probability as the second set of semantics.

III. EXEMPLARY SENSOR

Passive Infrared (PIR), breakbeams and cameras are currently the most widely used sensors for detecting motion without requiring tagging of individuals. PIR sensors provide coarse detection of motion in their field of view, and cameras output still pictures and video. While both these modalities work extremely well for certain applications, sensor networks in everyday life situations would significantly benefit from a sensing modality that generates more specific information than PIRs and more discriminating (and less energy and bandwidth consuming) than off-the-shelf cameras. Provided herein is a behavior sensing modality referred to as the turnsor. Like cameras, turnsors can sense the environment using an array of pixels. Unlike cameras however, turnsors have higher discriminative abilities. They can have high bandwidth inputs but produce low bandwidth symbolic outputs. These outputs take the form of phonemes that can be directly processed by a grammar hierarchy. By outputting symbolic information instead of images and video, turnsors are more privacy preserving than conventional cameras. The internal functionality of a turnsor cab be driven by a grammar hierarchy. In one aspect, a turnsor can provide interpreted tracking information (i.e., tracks will be classified into a set of turns and straight lines), locations and ambient light conditions. In another aspect, a turnsor can provide finer precision body gestures such as sitting down, getting-up, falling, turning, walking, running etc. These rely on the unique ability of turnsors to recognize humans using a set of visual human filters. The visual human filters allow for the summarization of human postures into a set of "strawman" silhouettes. This allows for further interpretation of activity using grammar hierarchies and enables the streaming of summarized video, i.e., with figures in strawman form over low bandwidth links. This could have significant impact in many home, military and commercial applications. For example, observing your children or grandparents at home from your wristwatch or cellphone LCD.

An important issue for sensor networks in everyday situations is the ability to robustly determine the presence of humans. PIR sensors can sense motion, but that is no guarantees as to whether the moving entity is a human. Nonetheless, the detection of humans is very fundamental to sensor networks that react to changes in the environment in almost real time and without a human-controller in the loop. Currently, the state of the art in locating silhouettes rests on background subtraction techniques and their derivatives. Although adequate in many cases, quite often it is clearly inadequate as it will detect both humans and other moving objects. The turnsor provides a fast and robust determination as to whether there is a human in the scene and at the same time what the pose the human is in. The visual appearance, depth and motion of a human are not arbitrary. Take motion as an example. The way humans appear to move when they perform actions is highly constrained.

A statistical analysis using many examples can be used to develop a visual human filter. For example, motion capture data can be obtained for actions in a database. This data can be transferred into an animation package. In this environment the actions in the database can be recreated for different actors, clothes, etc. PCA can be performed on depth poses which can produce eigenposes that can act as filters for detecting a human. Further analysis of the filter responses provides the pose. Thus, if the surveillance system is a binocular camera, filters can be performed on a depth image and the human figures can be detected. Motion based filters can be similarly developed. In this case, PCA can be performed on the key poses that contain motion information (i.e., every part of the silhouette can have a vector associated with it). Then the resulting filters can be performed on motion images.

Once the visual human filters are derived, the set of eigenposes can be compared against by executing a set of convolutions. Furthermore, a biomimetic camera architecture can be used that outputs information in an address-event representation. The internal imager architecture and the address-event representation outputs can rank order pixels from a visual scene in a time domain that makes much more lightweight processing.

Once a turnsor has identified a human, the pose of the human can be determined using a grammar. By way of example, an assisted living application allows more depth in the nature and structure of an underlying grammar. There are many actions that could be recognized by identifying movements of different parts of the body, like raising one's arm, turning, sitting, walking, etc. Such actions can be defined as visual ground verbs. They amount to actions (performed by one person) defined by movements of parts of the body. Similarly, visual "adverbs" and "adjectives" can be defined, characterizing a given action (e.g., walking), representing the manner in which it is performed and/or the individual performing the action.

Humans have an amazing capacity at recognizing action, even if a video is highly distorted. Turnsor can take advantage of this by utilizing a mechanism for selecting key frames or poses, i.e., video frames that collectively describe the action (that is, if only these poses were viewed in succession, the action would be recognized). Optic flow measurements can be utilized (the average flow of the silhouette) and the poses at the maxima and minima of the flow values selected. Intuitively, these poses correspond to changes in the dynamics. The partition becomes optimal when the poses are such that the same dynamics govern the transition from one pose to another.

Turnsors can be required to detect a number of actions. For these actions, for example, models can be built by videotaping the action against a white background from 8 different cameras. In each video keyframes can be found and all key frames in all views can make up the models. Using all these poses (and more generated with modeling software) and statistics, filters can be developed that provide silhouettes, which can drive a grammar (for example) to recognition in a multi-view invariant manner.

V. EXEMPLARY APPLICATIONS

An example of an application of the methods, systems, and apparatuses provide includes the assisted living sector. Medical doctors, gerontologists and other care givers agree that sensor technology could provide considerable help with Dementia and Alzheimer patients. There are applications in monitoring the activity level of subjects in their home, establish basic home activity patterns, such as, for example and not meant to be limiting, time in bed, time in specific rooms or locations, circulation activity levels, and the like.

The sensory grammar framework provided herein can also be applied to a wide variety of applications where domain experts are looking for a specific set of patterns. This includes habitat monitoring and workplace safety where a set of rules needs to be enforced. Other applications include the characterization of motion patterns in large department stores and malls (many of which already have extensive camera infrastructures). In entertainment and training infrastructures, the developed framework can be used to develop indoor games and training scenarios.

VI. EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the scope of the methods, systems, and apparatuses. Efforts have been made to ensure accuracy with respect to numbers (e.g., amounts, temperature, etc.), but some errors and deviations should be accounted for.

A. Example 1

Interpreting Behaviors From Tracking Data

Disclosed is an instance of the provided framework that uses a series of locations in time obtained from a camera network. A binary 1-bit sensor that can sense presence or absence of a person in its sensing range was used. The goal was to recognize the motion patterns of a person walking along a corridor inside a building. More specifically, recognizing left turns, right turns, U-turns and S-turns.

1. A Phoneme and PCFG Specification

Figure 10:
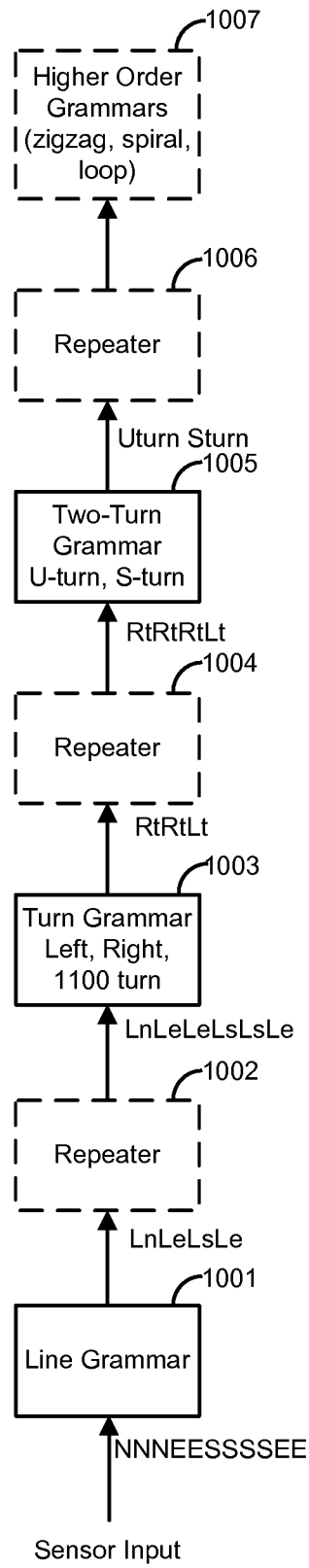
FIG. 10 is an exemplary hierarchical behavior interpretation using a sensory grammar.

A grid of sensor nodes in the corridor of a building can indicate the presence or absence of a person. The person is only allowed to move in four directions along this grid: North (N), South (S), East (E), and West (W). These four symbols were the terminal symbols or phonemes of the grammar. As shown in FIG. 10, the sensor grid returned a string of these phonemes as a person moves through the grid, NNNEESSSSEE.

As a first step, a grammar was defined to detect straight line movements of arbitrary length along each of the four directions. The four possible straight lines have symbols Ln, Ls, Le, Lw, which corresponded to lines of arbitrary length along the North, South, East and West directions respectively. A simple grammar for detecting these lines is shown below. Note that each expansion rule has an associated probability denoted by the superscript. These probabilities are currently distributed uniformly, but can be learned in a real system.

$V_N$={Start, M, L, Ln, Ls, Le, Lw}
$V_T$={N, S, E, W}
Start→$M^{(1.0)}$
M→$ML^{(0.5)}L^{(0.5)}$
L→$Ln^{(0.25)} Ls^{(0.25)} Le^{(0.25)} Lw^{(0.25)}$
Ln→$Ln\ N^{(0.5)}\ N^{(0.5)}$
Ls→$Ls\ S^{(0.5)}\ S^{(0.5)}$
Le→$Le\ E^{(0.5)}\ E^{(0.5)}$
Lw→$Lw W^{(0.5)}\ w^{(0.5)}$ This grammar was used to parse a string such as 'NNNEESSSSEE' at block 1001, and create a more compact representation from it, 'Ln Le Ls Le', which says that the motion which took place comprised just three straight line motions. A device or process referred to as a Repeater was defined, which took any string of symbols, and returned a string with all symbols duplicated except the first and the last symbol. The string 'Ln Le Ls Le' was passed to the repeater, it returned 'Ln Le Le Ls Ls Le' at block 1002. Note the repetition of the middle 'Le' and 'Ls'. Having this process can be necessary since some symbols are shared by subtrees in higher grammars.

At the next level, a grammar of single turns was defined, which took as input the output of the grammar of straight lines after passing through a Repeater. The output of the grammar of straight lines was in 'Ln Le Ls', which the Repeater changed to 'Ln Le Le Ls Ls Le'. This string can be parsed by the grammar of single turns shown below.

$V_N$={Start, M,T,Lt, Rt, πt}
$V_T$={Ln,Ls,Le,Lw}
Start→$M^{(1.0)}$
M→$M\ T^{(0.5)}|T^{(0.5)}$
T→$Lt^{(0.33)}|Rt^{(0.33)}|\pi t^{(0.33)}$
Lt→$Ln\ Lw^{(0.25)}|Lw\ Ls^{(0.25)}|Ls\ Le^{(0.25)}|Le\ Ln^{(0.25)}$
Rt→$Ln\ Le^{(0.25)}|Le\ Ls^{(0.25)}|Ls\ Lw^{(0.25)}|Lw\ Ln^{(0.25)}$
πt→$Ln\ LS^{(0.25)}|Ls\ Ln^{(0.25)}|Le\ Lw^{(0.25)}|Lw\ Le^{(0.25)}$ This grammar defined three simple turns, the left turn (Lt), the right turn (Rt), and the in-place 180° turn (πt). Given the string 'Ln Le Le Ls Ls Le', this grammar reduced it to a sequence of three simple turns 'Rt Rt Lt' at block 1003.

This output was now passed through another Repeater to get 'Rt Rt Rt Lt' at block 1004. This string was ready to be parsed by an even more complex grammar of two turns. This grammar consisted of a U-turn which involves two consecutive turns in the same direction, or an S-turn which involves consecutive turns in opposite directions.

$V_N$={Start, M,T,Uturn,Sturn}
$V_T$={Rt,Lt}
Start→$M^{(1.0)}$
M→$M\ T^{(0.5)}|T^{(0.5)}$
T→$Uturn^{(0.5)}|Sturn^{(0.5)}$
Uturn→$RtRt^{(0.5)}|LtLt^{(0.5)}$
Sturn→$RtLt^{(0.5)}|LtRt^{(0.5)}$ The given string 'Rt Rt Rt Lt' was condensed to 'Uturn Sturn' at block 1005. In the same manner, more complex behaviors could be defined such as a zigzag motion (which consists of alternate U and S turns), or a spiral motion (which is a sequence of U turns) using a repeater at block 1006 and higher level grammar at block 1007. If identification of closed curves such as a square shape was desired, it could have been accomplished by augmenting or lexicalizing the context-free grammar with step counts, since closure requires keeping track of the number of transitions of the person in each direction in the grid. Another option is to use a context-sensitive grammar. FIG. 10 shows how such a hierarchy of increasingly complex behaviors may be created by starting out with simple behaviors such as straight lines and turns.

2. Message Passing

Messages exchanged fell into two different categories: the internal and the external messages. Internal message passing described the communication between the different layers of the grammar hierarchy that co-existed on the same node. The output of each level became the input for the level right above it. This communication was triggered by the local observations and did not involve any radio communication. Conversely, whenever the target exited the field of view of node A and entered the field of view of node B, a message containing the output of each level running on node A was sent from node A to node B. This implementation this resulted in a packet containing 18 bytes of data.

3. Evaluation

Figure 11:
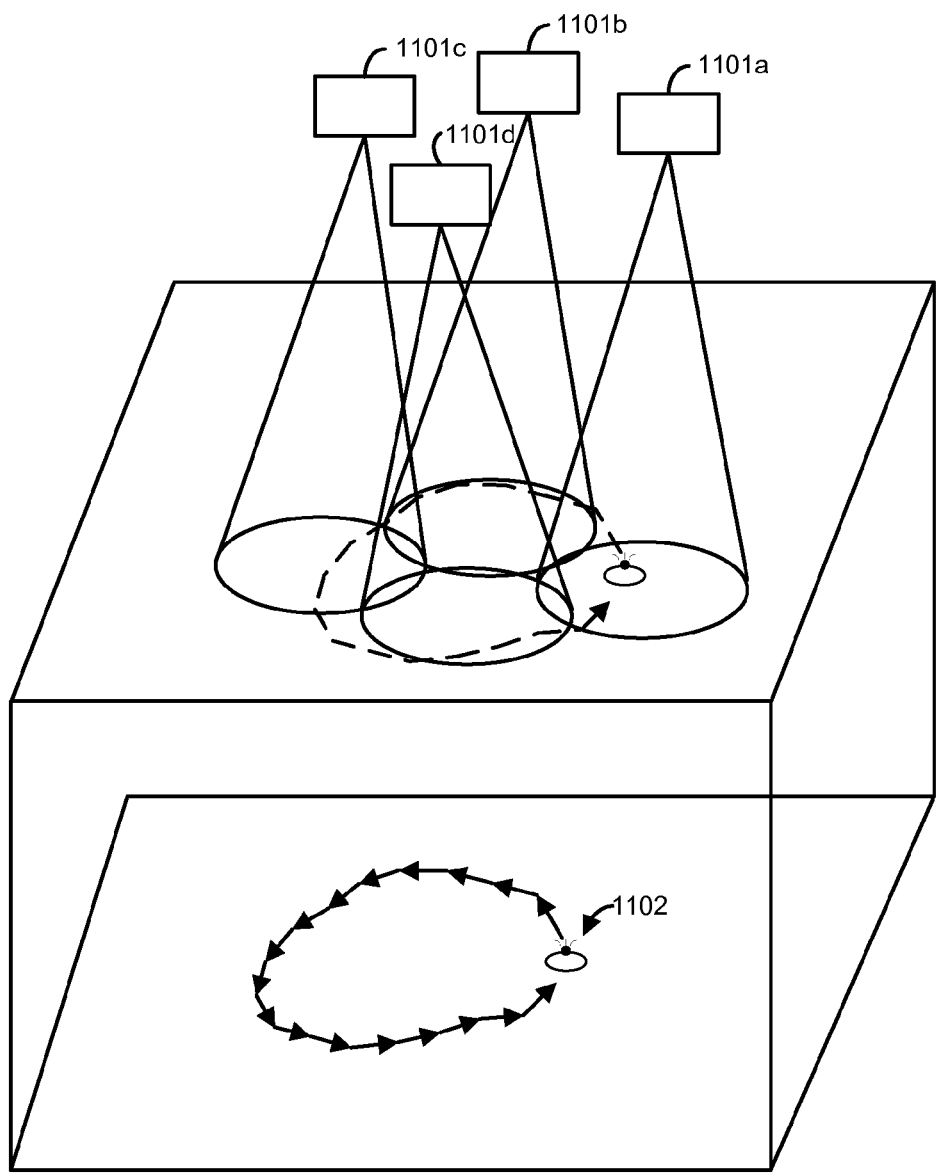
FIG. 11 is an exemplary sensor layout.

To validate the framework we used a fraction of a camera-based sensor network testbed. The test configuration was comprised of a 4×4 grid of XYZ sensor nodes equipped with a low-power camera module from Omnivision (OV7649). The cameras 1101a,b,c,d were attached to the ceiling facing into the room as shown in FIG. 11. These nodes could localize in their image plane a mobile node carrying a bright red LED 1102. The mobile node was used to emulate the motion of an individual walking along a corridor. Each node was programmed to capture images at 4 frames per second, and to identify the image coordinates of the red LED in the scene with the same frequency. The camera network was pre-calibrated and used the LED image coordinates at consecutive frames to compute motion vectors for the LED. 3D Node localization and camera calibration was also performed online.

The data recorded using our testbed was used to simulate the performance of the proposed hierarchical grammar. The PCFG implementation in the Natural Language Toolkit (NLTK, http://nitk.sourceforge.net) was used, which incorporates a Viterbi-style parser for PCFGs. NLTK's PCFG parser is a bottom-up parser that uses dynamic programming to find the single most probable parse for a sequence of observed events (motion vectors in our case). It parses its input by iteratively filling in a most probable constituents table. This table records the most probable tree structure for each span (number of observed events combined together) and node value (terminal or non-terminal symbol). In particular, it has an entry for every start index, end index, and node value, recording the most probable subtree that spans from the start index to the end index, and has the given node value. Once the table has been completely filled in, the parser simply returns the entry for the most probable constituent that spans the entire input, and whose node value is the start symbol.

The output of the simulations was the most probable parse trees generated from the Viterbi parser. In other words, for every sequence of motion vector observations that was given as input to the simulation tool, the most probable parse tree was reported for every level of the proposed hierarchical grammar. Each parse tree represented the behavior that was detected at each level based on the input data.

Figure 12A:
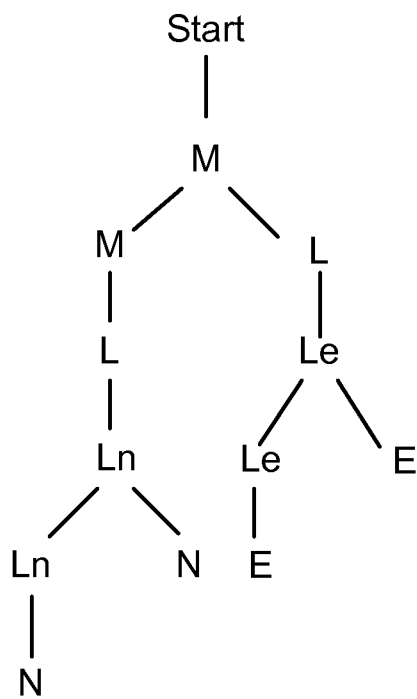
FIG. 12A illustrates an exemplary most probable parse tree for a Level 0 grammar.
Figure 12B:
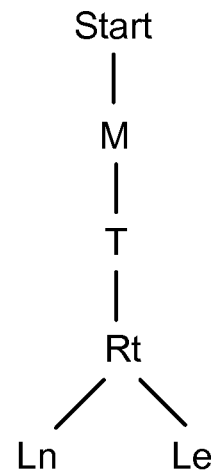
FIG. 12B illustrates an exemplary most probable parse tree for a Level 1 grammar.
Figure 13A:
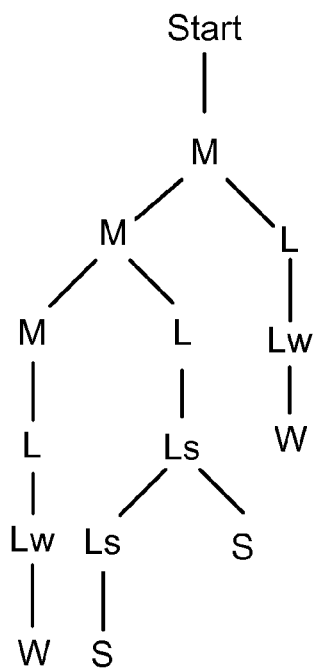
FIG. 13A illustrates an exemplary most probable parse tree for a Level 0 grammar.
Figure 13C:
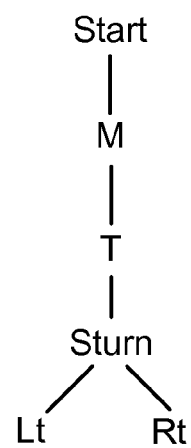
FIG. 13C illustrates an exemplary most probable parse tree for a Level 2 grammar.
Figure 13B:
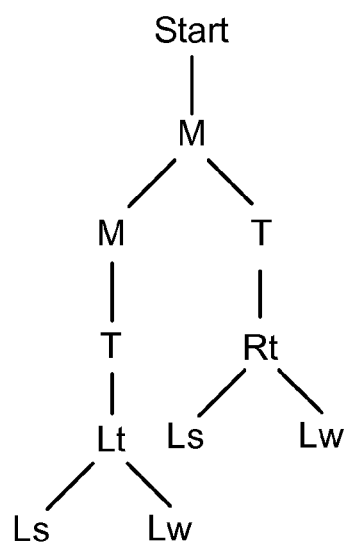
FIG. 13B illustrates an exemplary most probable parse tree for a Level 1 grammar.
Figure 14A:
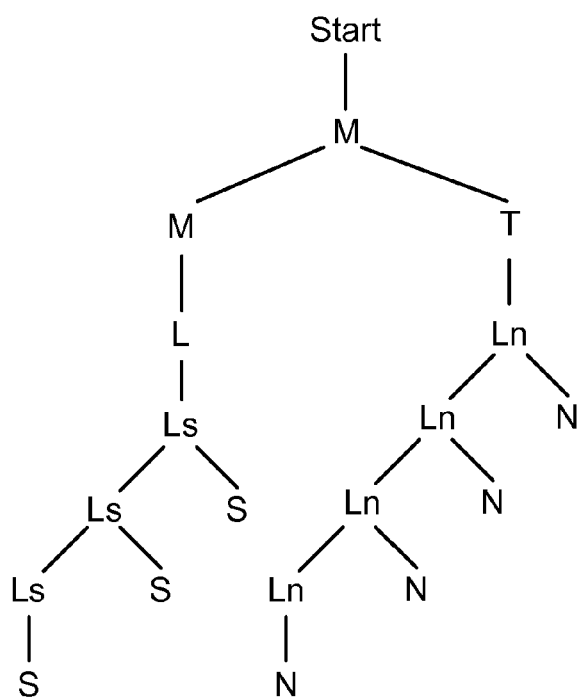
FIG. 14A illustrates an exemplary most probable parse tree for a Level 0 grammar.
Figure 14B:
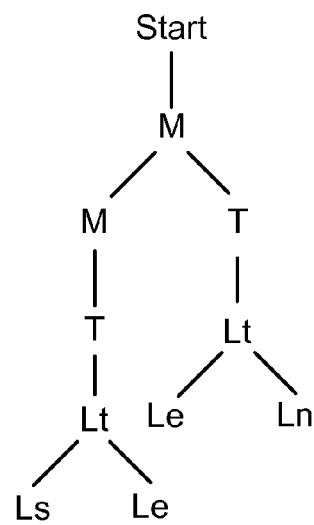
FIG. 14B illustrates an exemplary most probable parse tree for a Level 1 grammar.
Figure 14C:
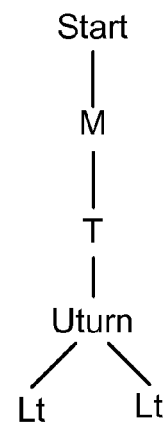
FIG. 14C illustrates an exemplary most probable parse tree for a Level 2 grammar.
Figure 15:
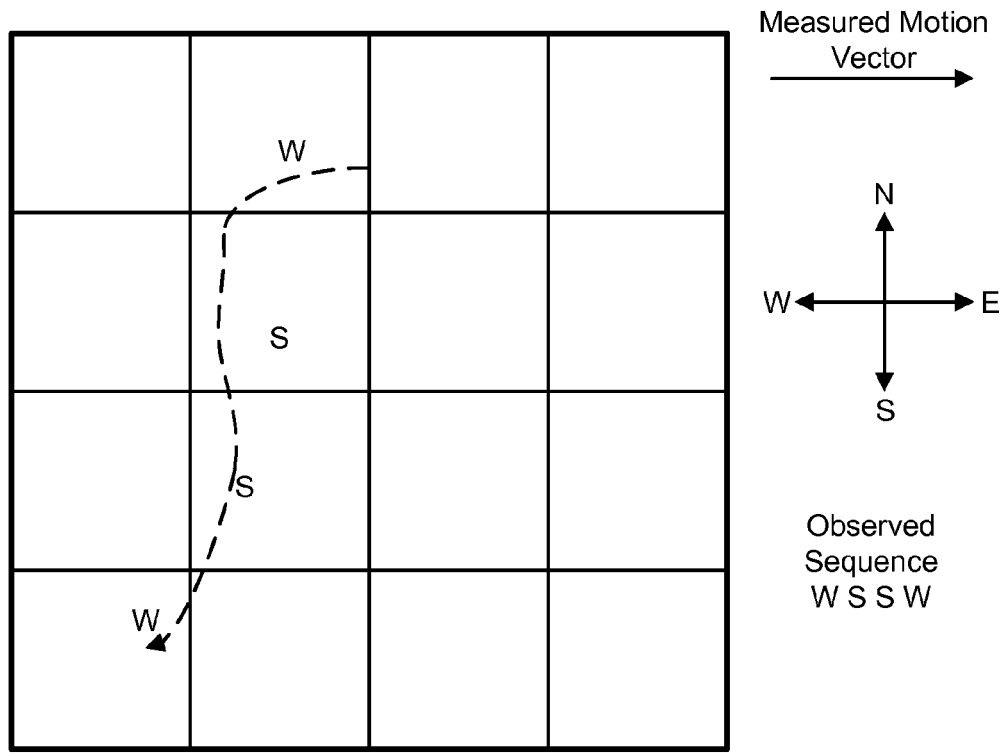
FIG. 15 illustrates an S-turn pattern inside a 4×4 grid.

In the first experiment each camera-enabled sensor node recorded the point of entrance and point of exit of a moving target on the image plane, and computed a motion/direction vector using a localization algorithm. This direction vector was then mapped into one of the four possible phonemes N, S, E, and W. In particular, the phoneme that minimizes the directional difference from the measured direction vector was chosen. This setup corresponded to a 4×4 grid of camera nodes where each node records only one motion vector. To evaluate the accuracy of the proposed hierarchical grammar, a moving person performed several right turns, S-turns and U-turns covering a large fraction of the monitored area every time. The typical most probable parse trees for each one of these motion behaviors can be seen in FIG. 12, FIG. 13, and FIG. 14. In all cases the hierarchical grammar identified the correct motion behaviors at different levels let us consider the case of the S-turn pattern in FIG. 15. The motion pattern took place in 4 different squares (camera-enabled sensor nodes) inside the 4×4 grid. Each sensor node observed a phoneme (N, S, E, or W). In that way, the S-turn could now be expressed as an ordered sequence of phonemes: WSSW. This ordered sequence of phonemes was given as input to the first level grammar (FIG. 13A). The output of this level was a new ordered sequence: LwLsLw. The output of the first level was fed to a repeater and it became: LwLsLsLw. The second level of the hierarchical grammar (FIG. 13B) transformed this sequence to: LtRt. The new sequence was fed to the third level grammar after passing through a repeater. By definition, the repeater did not change the sequence LtRt. The third level grammar (FIG. 13C) translated this sequence to an S-turn which was the initially performed behavior.

In order to verify how the accuracy of the proposed hierarchical grammar was affected by the grid resolution, the same set of turns, S-turns and U-turns was applied on grids of different sizes: 8×8 and 20×20. Those grid sizes were simulated using the 4×4 sensor network grid. Each camera-enabled node segmented its image plane to a 2×2 and 5×5 grid. In that case, each camera recorded a direction vector for every square grid on its image plane. The results were not differentiated from the results shown in FIG. 12, FIG. 13, and FIG. 14. The main difference was in the depth of the parse trees. This showed that the proposed hierarchy of grammars scaled well with the grid resolution.

Figure 16:
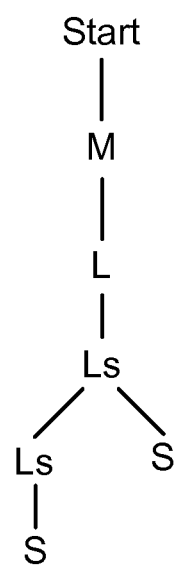
FIG. 16 illustrates an exemplary most probable parse tree for a Level 0 grammar.
Figure 17B:
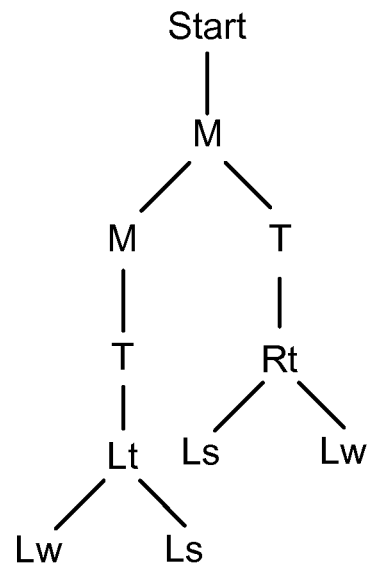
FIG. 17B illustrates an exemplary most probable parse tree for a Level 1 grammar.
Figure 17A:
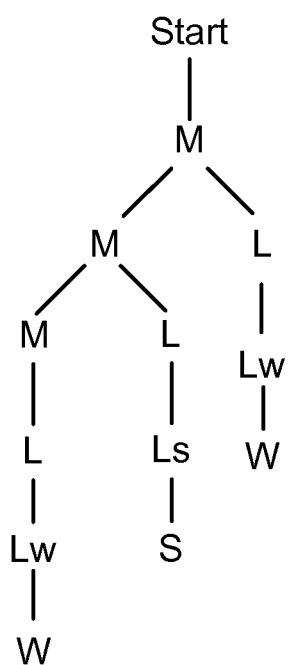
FIG. 17A illustrates an exemplary most probable parse tree for a Level 0 grammar.
Figure 17C:
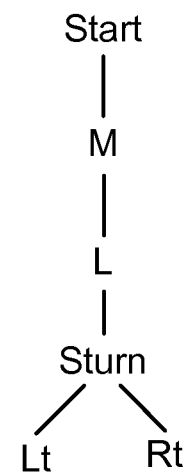
FIG. 17C illustrates an exemplary most probable parse tree for a Level 2 grammar.

The motion patterns that were used in the previous experiments were covering a large fraction of the monitored area. To push the system, a new data set was created where a person was performing small scale S-turns that were covering only a small fraction (approximately 15%) of the monitored area. Data was gathered for 3 different configurations: 4×4, 8×8, and 20×20 grids. The results for each configuration can be seen in FIG. 16, FIG. 17, and FIG. 18. It is clear that in the case of the 4×4 grid (FIG. 16) the output of the grammar was wrong since the performed behavior was not detected. The main reason was the fact that only one direction vector was recorded per square grid. When the scale of the motion pattern was small and the grid resolution was low, using only one direction vector per square grid was not enough because drastic changes in motion behavior might be undetected. For instance, consider the S-turn shown in FIG. 15. If a 2×2 grid were used instead of a 4×4 grid, then the ordered sequence of observations would change from: WSSW to SS. While the former sequence of observations provided enough information for the grammar to identify the S-turn the latter does not.

Figure 18A:
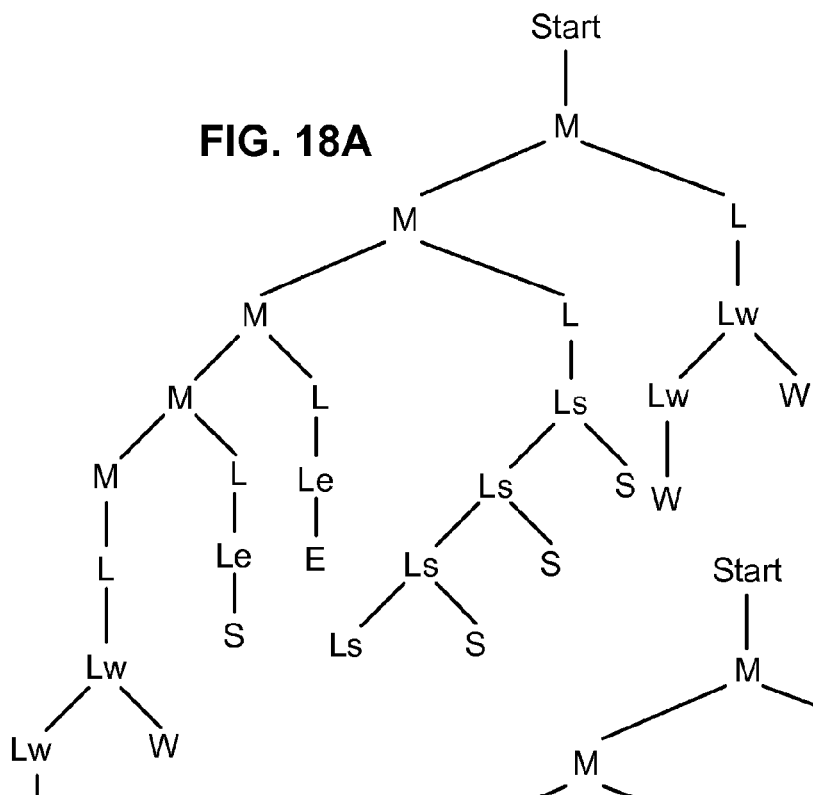
FIG. 18A illustrates an exemplary most probable parse tree for a Level 0 grammar.

This problem could be addressed by segmenting the image plane of a camera to a virtual grid. Keeping track of a direction vector per square grid on the image plane allowed the camera-enabled sensor node to collect the information required to classify the performed motion pattern. This approach was verified by the results shown in FIG. 17. Higher grid resolution allowed the collection of more information about the observable motion pattern leading to its correct classification. However, as FIG. 18 shows, the resolution of the grid cannot be arbitrarily high. In the case of the 20×20 grid the oversampling of the observed motion pattern led to a wrong classification. These results show that for a given sensor network coverage, there is typically a minimum and a maximum scale of the behavior that can be identified.

B. Example 2

Recognizing Activities—Cooking

Figure 19:
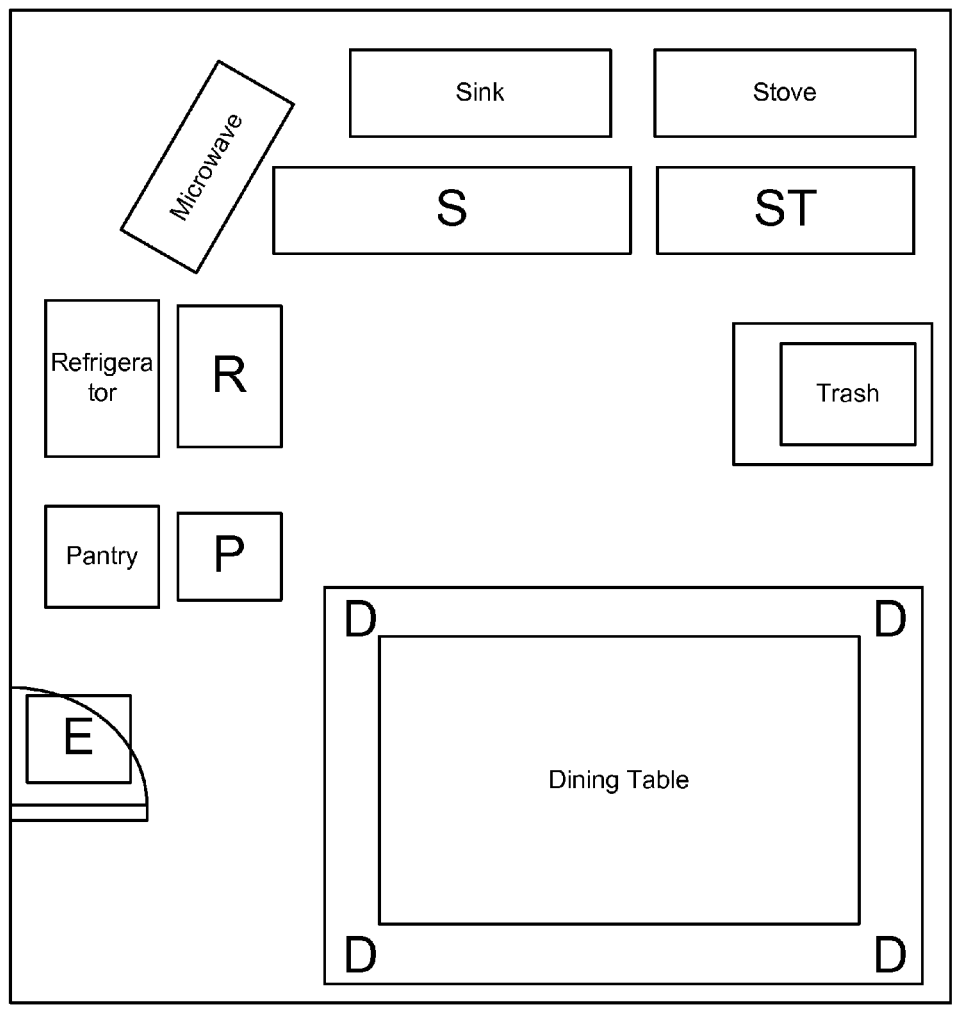
FIG. 19 is an exemplary kitchen layout.

To specify a sensory grammar that recognizes cooking, the cooking activity had to be decomposed into a sequence of basic actions. The description of the "act of cooking" (we will refer to this as "cooking activity" from now on) was based on the kitchen floor plan shown in FIG. 19. To simplify the discussion the sensing modality is first abstracted out by assuming that there is a sensor that can reliably detect if a person is in areas D, R, P, S, and ST in FIG. 19. These areas denote where the subject will be located when using the dining table, refrigerator, pantry, sink, and stove respectively. The symbol E is also used to denote the exit area of the kitchen.

On the one hand, these actions should not be too abstract or too general because the difficulty of robustly detecting these actions increases significantly. On the other hand, these actions should be general enough to capture multiple instances of the activity. According to these considerations, the food preparation process was decomposed into four main components, each of which required a set of smaller actions:

1. Get ingredients from the refrigerator and the pantry.
2. Prepare the dish by spending time at the sink.
3. Cook the food by spending time at the stove.
4. Serve the dish at the dining table.

Using this decomposition of the food preparation process, cooking could be described as the ordered sequence of actions 1, 2, 3 and 4. However, this simple description of the cooking process was not adequate to capture all the different instances of a real cooking activity. In general, humans do not perform actions, such as cooking, by strictly following a sequence of actions. Humans tend to forget and/or repeat actions without any obvious reason. For instance, people never get all the ingredients at once. Usually, they get a portion of them, they prepare it, then they get the rest of the ingredients and so on. Also, even in a specific activity, such as cooking, people tend to multitask. For instance, while the food is on the stove, appetizers can be prepared at the sink or the initial preparation of the table might take place (put the dishes at the table, get sodas and drinks from the refrigerator, etc.). It becomes apparent that there is a large number of different sequences of actions that describe a realistic cooking activity. In various aspect, a robust grammar definition should be able to recognize as many of these instances as possible and at the same time differentiate them from other similar activities that might take place in the monitored area.

Figure 20:
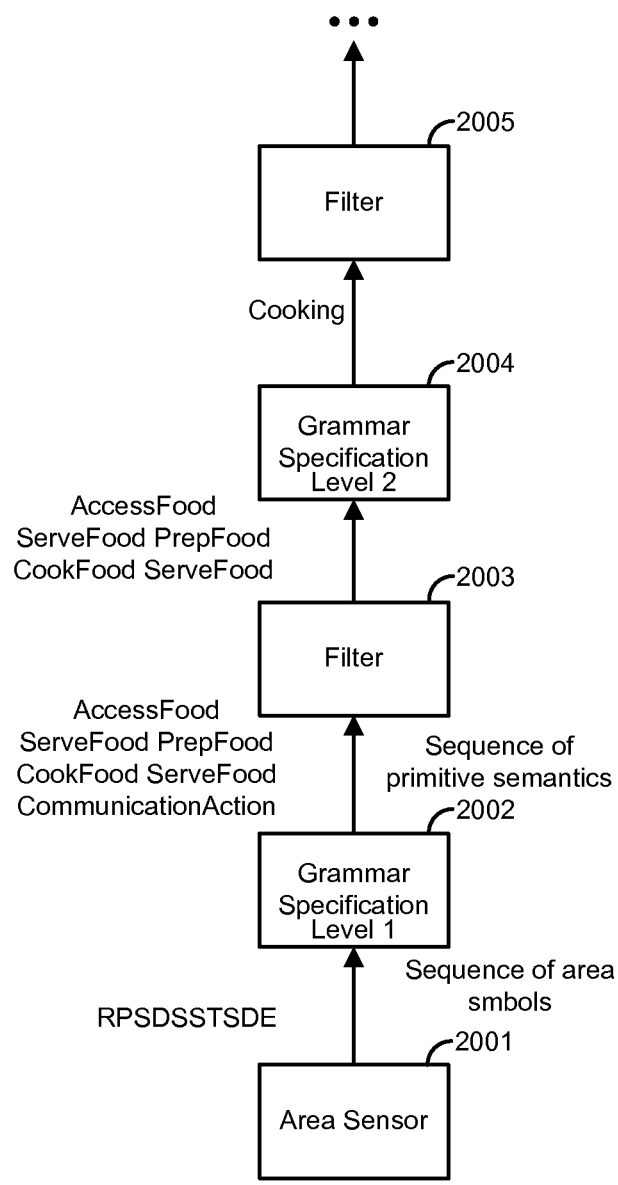
FIG. 20 is an exemplary two-level grammar hierarchy for the detection of cooking activity.

A high level diagram of a 2-Level grammar hierarchy for recognizing cooking activity is shown in FIG. 20. At the lowest level, a sensor correlated a subject's location with areas and provides a string of symbols at block 2001, where each symbol corresponded to an area in the kitchen (e.g., R, P, S, etc.). This string of symbols was then fed as input to the first level grammar at block 2002 which translated it and summarized it to a new string of higher level semantics. These semantics may be related to the detection of the cooking activity (e.g., AccessFood, PrepFood, CookFood, etc.) or they may represent Exceptions (e.g., CommunicationAction). Exceptions are not different from other semantics produced by the grammar but their logical interpretation is different. For instance, a typical exception could be the presence of a person at a specific location or area for more or less than a predefined time period. In the case of the cooking grammar, the presence of a person at the stove for less than a predefined minimum amount of time would mean that the person is visiting the stove in the context of another activity different than cooking (e.g., the person passes by the stove while trying to reach the phone that is ringing). Having defined Exceptions, the output of a grammar can be seen as a sequence of symbols that may contain exceptions. As a result of this, the Filter component was introduced along with the notion of Exceptions and Exception Handling. The Filter component deals with the Exceptions by removing them from the output sequence of a grammar.

The removed Exceptions were fed to an Exception Handler that is responsible for triggering the necessary actions assigned to each type of Exception. The exception-free sequence of symbols generated by the Filter component at block 2003 was then fed as input to the next grammar in the hierarchy. The second-level grammar used the high-level semantics at block 2004 identified at the immediate previous level to describe and identify a typical cooking activity. The output of the second level grammar in the hierarchy was then passed through a Filter at block 2005 so that possible exceptions that were detected are handled properly. In the same way the output of the second-level grammar can be fed to any other higher level grammar for the detection of even more abstract semantics.

TABLE 1

Cooking Grammar

Level 1 Grammar

Input: A sequence of any of the terminal symbols: {R,P,S,ST,D,E}
Output: A sequence of any of the following non-terminal symbols: {AccessFood, PrepFood, CookFood, ServeFood, CommunicationAction}
1. $V_N$ = {Start, M, Action, CommunicationAction, FoodAction, AccessFood, PrepFood, CookFood, ServeFood}
2. $V_T$ = {R,P,S,ST,D}
3. Start → $M^{(1.0)}$
4. M → MAction$^{(0.5)}$ |Action$^{(0.5)}$
5. Action → FoodAction$^{(0.5)}$ | CommunicationAction $^{(0.5)}$
6. CommunicationAction → CommunicationActionE$^{(0.5)}$ | E$^{(0.5)}$
7. FoodAction → AccessFood$^{(0.25)}$ | PrepFood$^{(0.25)}$ | CookFood$^{(0.25)}$ | ServeFood$^{(0.25)}$
8. AccessFood → RAccessFood$^{(0.16)}$ | PAccessFood$^{(0.16)}$ | RS$^{(0.16)}$ | PS$^{(0.16)}$ |RST$^{(0.16)}$ | PST$^{(0.16)}$
9. PrepFood → SPrepFood$^{(0.5)}$ | S$^{(0.5)}$
10. CookFood → STCookFood$^{(0.5)}$ | ST$^{(0.5)}$
11. ServeFood → ServeFoodSD$^{(0.1)}$ | ServeFoodRD$^{(0.1)}$ | ServeFoodSTD$^{(0.1)}$ | ServeFoodPD$^{(0.1)}$ | ServeFoodD$^{(0.1)}$ | SD$^{(0.1)}$ | RD$^{(0.1)}$ | STD$^{(0.1)}$ | PD$^{(0.1)}$ | D$^{(0.1)}$ Level 2 Grammar Input: A sequence of any of the following non-terminal symbols: (AccessFood, PrepFood, CookFood, ServeFood}
Output: A sequence of any of the following non-terminal symbols: {Cooking}
1. $V_N$ = {Start, M, Cooking, Process, Prepare}
2. $V_T$ = {AccessFood, PrepFood, CookFood, ServeFood}
3. Start → $M^{(1.0)}$
4. M → MCooking$^{(0.5)}$ |Cooking$^{(0.5)}$
5. Cooking → ProcessCooking$^{(0.2)}$ | CookFoodCooking$^{(0.2)}$ | PrepareCooking$^{(0.2)}$ | ProcessCookFoodProcess$^{(0.2)}$ | PrepareCookFoodProcess$^{(0.2)}$
6. Prepare → AccessFoodPrepare$^{(0.25)}$ | PrepFoodPrepare$^{(0.25)}$ | AccessFood$^{(0.25)}$ | PrepFood$^{(0.25)}$
7. Process → ServeFoodProcess$^{(0.25)}$ | PrepareProcess$^{(0.25)}$ | ServeFoodPrepare$^{(0.25)}$ | ServeFood$^{(0.25)}$ The detailed implementation of the proposed grammar hierarchy is shown in Table 1. The Grammar at Level identifies the four cooking activity components (FoodAction) and the communication triggering component CommunicationAction by assuming that the underlying sensing modality will provide a sequence of activity regions; the phonemes of this language. Lines 1 and 2 specify the non-terminal and terminal symbols of this language. The terminal symbols are fed as input to the grammar and represent the different activity regions. Therefore, an input to the Level 1 grammar consists of a string of the predefined activity regions R, P, S, ST, D and E. The non-terminal symbols include the four cooking components and a set of standard symbols including the Start and M symbols. The non-terminal symbols in a grammar represent the semantics to which the input of the grammar is mapped. Note also that there is an explicit hierarchy of the semantics in the grammar. For instance; the Action semantic is composed by the FoodAction and/or CommunicationAction semantics. This hierarchy allows expression of the output of the grammar at different levels of granularity. For instance, the output of the first level grammar could be either a sequence of FoodAction and CommunicationAction semantics or a sequence of AccesFood, PrepFood, CookFood, ServeFood and CommunicationAction semantics. In this case, the output of the first-level grammar is the latter one. In other words the output of the first-level grammar can be a string of the AccessFood, PrepFood, CookFood and CommunicationAction semantics.

The rest of the lines in Table 1 describe the production rules of the first-level grammar. Lines 4 and 5 describe how to recursively generate an arbitrary sequence of FoodAction and CommunicationAction semantics. Line 6 provides the definition of the CommunicationAction semantic as any sequence of consecutive E terminal symbols. The CommunicationAction semantic is nothing more than a specific instance of an Exception. This exception semantic embeds the actual communication protocol in the inference framework. Its purpose is to actually trigger communication in the sensor network when the person leaves the kitchen. Whenever a person is moving out of the kitchen, the sensor node in the kitchen will parse its observations and it will transmit the output to the sensor network.

Line 7 describes the FoodAction semantic as any of the AccessFood, PrepFood, CookFood or ServeFood semantics. Each one of these semantics is defined as a sequence of terminal symbols in Lines 8-11. Line 8 defines the AccessFood semantic as any trip between the refrigerator R and the pantry P, that ends at the sink S or the stove ST. Lines 9 and 10 define the PrepFood and CookFood semantics as being at the sink S and the stove ST respectively. Line 11 describes ServeFood as any sequence of trips between any of the possible areas R, P, S, and ST and the dining table D. Note that the number of appearances of each of the terminal symbols or even the exact order of appearance is not explicitly defined in Lines 8 and 11. However, the recursive nature of the production rules allows the unified description of numerous different expressions for the AccessFood and ServeFood semantics. This shows the great generative power of grammars where very simple rules close to the human description language can be used to describe numerous instances of the same complex activity.

The Grammar at Level 2 takes as input the activity components identified at Level 1 to describe a typical cooking activity. As it can be seen by Line 2, the vocabulary of the second level grammar is composed by the output semantics of the first level grammar. The output of this level is a sequence of Cooking semantics. Lines 3 and 4 use typical recursion to allow multiple appearances of the cooking activity. Note that in that way a simple typical cooking activity can be described as a sequence of Cooking semantics. This simplifies the description of the grammar without affecting its recognition functionality. The Cooking semantic is described in Line 5 as any sequence of the CookFood, Process and ServeFood semantics that starts with the Process or Prepare semantics, ends with the Process semantic and contains at least once the CookFood semantic. Line 6 describes the Prepare semantic as any sequence of the terminal symbols excluding the CookFood symbol. Line 7 defines the Process semantic as any sequence of the Prepare and ServeFood semantics that contains at least once, the ServeFood semantic. Note, that again because of the recursive nature of their definition, each one of the production rules in Lines 5 and 6 can correspond to a large number of different instances of the cooking activity. However, this large number of different instances are described in 6 lines of production rules for the second level grammar and 11 lines of production rules for the first level grammar.

Since the grammar is probabilistic, each production rule is associated with a probability denoted as a superscript inside parentheses at the end of each production rule. Note that the sum of the production probabilities for each non-terminal sums up to one. In the grammars shown in Table 1, it can be assumed that there is a uniform probability distribution for the production rules. In other words, every production rule for each non-terminal symbol is assigned the same probability. However, in some particular scenarios these probabilities could be learned from ground truth data. This could be done by applying this grammar on real data and keeping track of how often each production rule is used. The more often a production rule is used, the higher its probability.

Figure 21A:
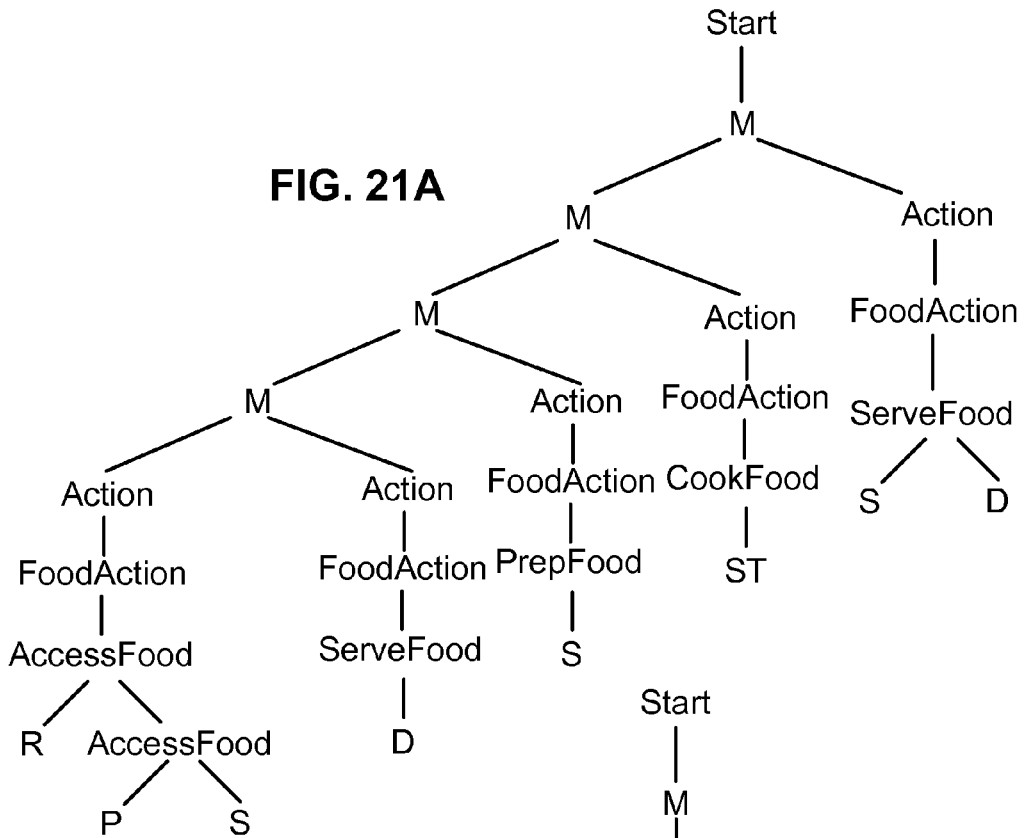
FIG. 21A is a probabilistic tree for a Level 1 grammar.
Figure 21B:
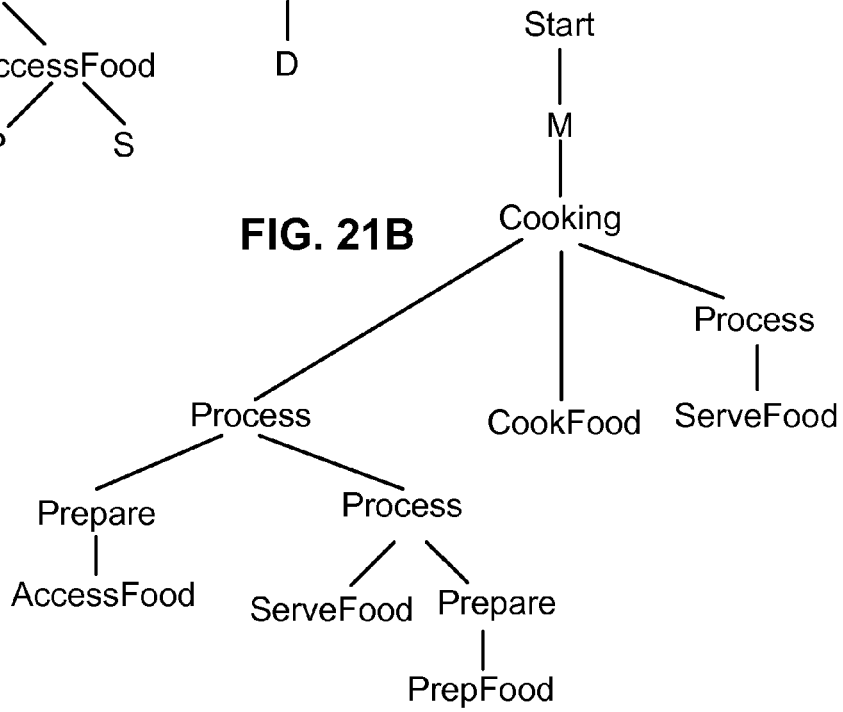
FIG. 21B is a probabilistic tree for a Level 2 grammar.

The grammar parser makes use of these probabilities, to calculate the most probable string of non-terminal symbols for a given input string of terminal symbols. Level 1 of the grammar translates a sequence of object areas (such as Refrigerator, Dining Table, etc. ... ) into a new sequence of basic cooking components (FoodAction) in a probabilistic way. The probabilistic nature of this translation implies that the same input sequence might correspond to different sequences of the basic cooking components according to the grammar definition. For each of these possible different output sequences a probability was computed based on the individual probabilities of the production rules used to derive each output sequence. The output sequence with the highest probability was chosen as the final output sequence of the Level 1 grammar. This output was then fed into a Level 2 grammar which in the same way translated a sequence of basic cooking actions to a sequence of cooking actions. FIG. 21 shows the most probable parse trees for both levels and for a given input sequence of object areas. As it can be easily verified, each edge in the tree corresponds to a production rule of the corresponding grammar. The probability assigned to the parse tree is computed by multiplying the probabilities at each branch from the root to the leaves and then summing the probabilities of all the branches in the tree. In FIG. 21A there are 5 branches with probabilities ($p_1$ corresponds to the leftmost branch and $p_5$ to the rightmost branch):

$$p_1=(0.5)^4 \times 0.5 \times 0.5 \times 0.25 \times (0.166)^2=0.0001075$$

$$p_2=(0.5)^4 \times 0.5 \times 0.25 \times 0.1=0.000781$$

$$p_3=(0.5)^3 \times 0.5 \times 0.25 \times 0.5=0.0078125$$

$$p_4=(0.5)^2 \times 0.5 \times 0.25 \times 0.5=0.015625$$

$$p_5=(0.5) \times 0.5 \times 0.25 \times 0.1=0.00625$$

The probability of the tree is equal to $$\sum_{i=1}^{4} p_i = 0.0305.$$

Figure 18B:
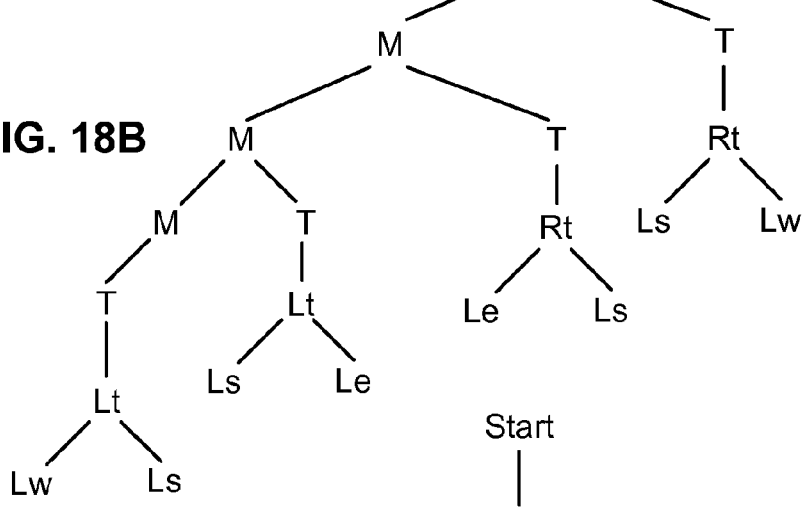
FIG. 18B illustrates an exemplary most probable parse tree for a Level 1 grammar.
Figure 18C:
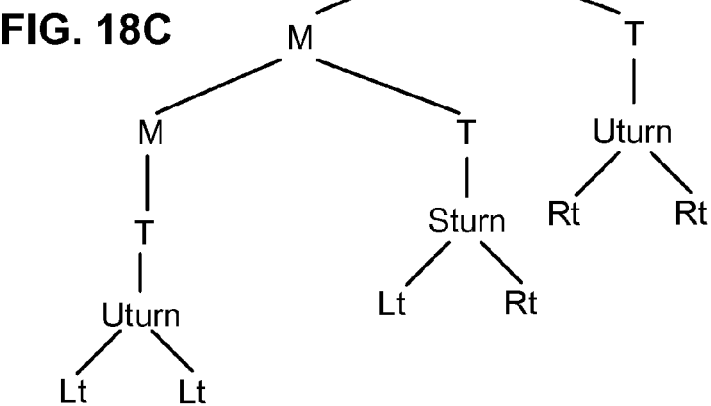
FIG. 18C illustrates an exemplary most probable parse tree for a Level 2 grammar.

In a similar fashion, a probability for the tress shown in FIG. 18B can be computed using the probabilities assigned to the production rules shown in Table 1.

The cooking grammar hierarchy presented makes use of spatial-only information to differentiate among different activities taking place inside a kitchen. In many other situations, however, spatial information must be combined with temporal information to filter out false positive inputs. For instance, consider an assisted living system that is responsible for detecting emergency situations. A possible instance of such a system is one that attempts to identify when someone is sick based on bath room visit frequency. It is clear that spatial only information is not enough to identify if the person is regularly using the bathroom. Conversely, the time spent each time or the time period between successive visits to the bathroom could be used to extract the desired information.

It is advantageous to model time as a separate sensing modality. In other words, from the perspective of the inference framework, time is treated as another sensing modality provided by the sensing layer that does not require any special handling. This extends the grammar structure provided in Table 1 by only another sensing modality while preserving the existing modularity and structure of the framework.

Modeling time as a sensor in the system allows the construction of hierarchical grammars over time. In other words, time semantics can be generated and consumed at different levels of the inference structure and therefore at different levels of granularity. In that way, robustness can be embedded in the framework at all the different levels of grammar hierarchy.

Figure 22:
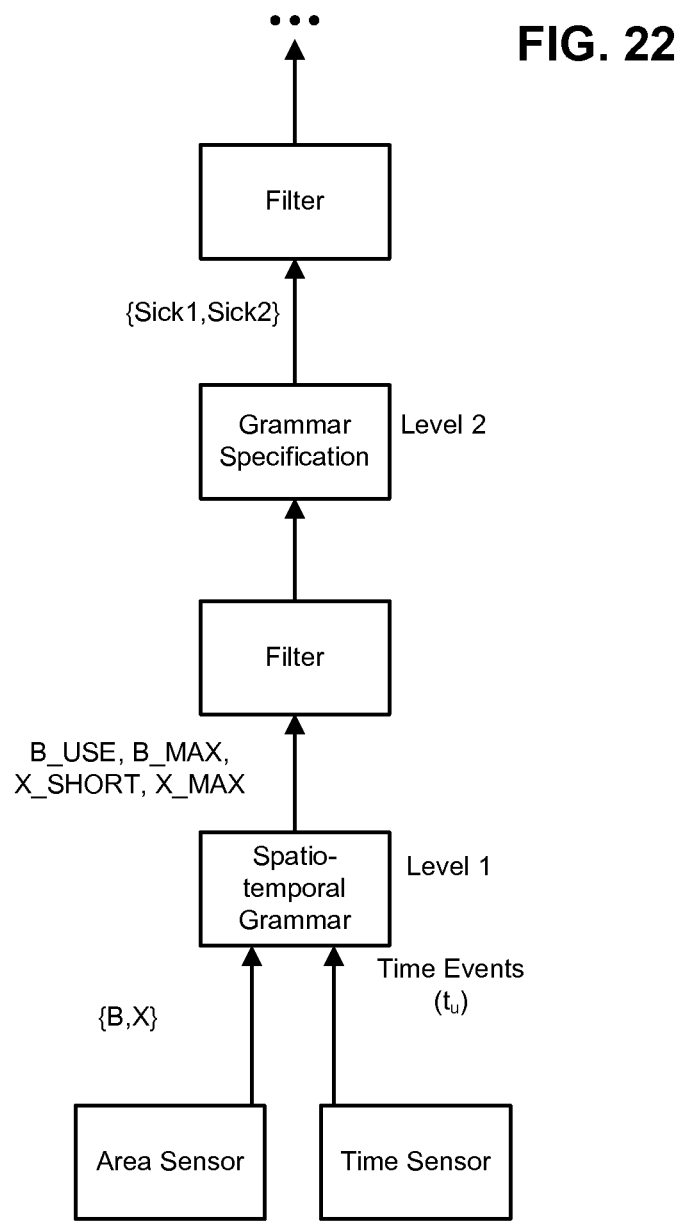
FIG. 22 is an exemplary two-level grammar hierarchy for the detection of emergency situations.

To demonstrate this way of modeling time in the grammar hierarchy a time-augmented grammar hierarchy was developed to detect emergency situations such as "The person in the house is sick". The adjective "sick" was defined as the person staying in the bathroom for an unusually long time period or as the person visiting the bathroom repeatedly in very short periods of time. The time-augmented grammar is shown in FIG. 22. Time is shown as an extra sensing modality that is subject to its own calibration. The purpose of the calibration is to discretize time and translate it into a sequence of periodic events with a fixed interval $t_u$. The trained outputs of the location/area and time sensors were directly fed into a spatiotemporal grammar. The functionality of this grammar was not just to interpret and summarize its input. Its major contribution in the hierarchy was the fact that it translates one-dimensional symbols (object areas) to 2-dimensional symbols (spatiotemporal objects) by combining two different sensing modalities (time and area sensors in this case). This allowed the higher layers of the inference structure to operate on multidimensional symbols that extended over both space and time. Other sensing modalities could have been used in the same way in order to describe N-dimensional symbols. Using multiple sensing modalities to define a symbol leads to a more accurate and therefore more robust definition of a symbol that is easier to detect and differentiate from other symbols. The second level grammar was using the output of the spatiotemporal grammar to monitor the frequency of visits in the bathroom and infer whether the monitored person is sick or not.

TABLE 2

Time Augmented Grammar for Detecting Unusual Use of Bathroom

Level 1 Grammar

Input: A sequence of any of the terminal symbols: $\{B, X, t_u\}$
Output: A sequence of any of the following non-terminal symbols: $\{B\_USE, B\_MAX, X\_SHORT, X\_MAX\}$
1. $V_N = \{$Start, M, Spatiotemporal, B\_USE, B\_MAX, X\_SHORT, X\_MAX, $t_{min}^B, t_{max}^B, t_{min}^X, t_{max}^X \}$
2. $V_T = \{B, X, t_u\}$
3. Start $\rightarrow M^{(1.0)}$
4. M $\rightarrow$ M Spatiotemporal$^{(0.5)}$ | Spatiotemporal $^{(0.5)}$
5. Spatiotemporal $\rightarrow$ B\_USE$^{(0.25)}$ | B\_MAX$^{(0.25)}$ | X\_SHORT$^{(0.25)}$ | X\_MAX$^{(0.25)}$
6. B\_USE $\rightarrow t_{min}^{B(1.0)}$
7. B\_MAX $\rightarrow t_{max}^{B(1.0)}$
8. X\_SHORT $\rightarrow t_{min}^{X(1.0)}$
9. X\_MAX $\rightarrow t_{max}^{X(1.0)}$
10. $t_{min}^B \rightarrow t_{min}^{B(1.0)} | t_u^{(0.5)}$
11. $t_{max}^B \rightarrow t_{max}^{B(1.0)} | t_u t_u t_u t_u t_u t_u t_u t_u t_u^{(0.5)}$
12. $t_{min}^X \rightarrow t_{min}^{X(1.0)} | t_u t_u t_u t_u t_u^{(0.5)}$
13. $t_{max}^X \rightarrow t_{max}^{X(1.0)} | t_u t_u t_u t_u t_u t_u t_u t_u t_u t_u t_u t_u t_u t_u t_u t_u^{(0.5)}$ Level 2 Grammar Input: A sequence of any of the following non-terminal symbols: $\{B\_USE, B\_MAX, X\_SHORT, X\_MAX\}$
Output: A sequence of any of the following non-terminal symbols: $\{Sick\}$
1. $V_N = \{$Start, M, Sick, Sick1, Sick2$\}$
2. $V_T = \{B\_USE, B\_MAX, X\_SHORT, X\_MAX\}$
3. Start $\rightarrow M^{(1.0)}$
4. M $\rightarrow$ MSick$^{(0.5)}$ |Sick$^{(0.5)}$
5. Sick $\rightarrow$ Sick1$^{(0.5)}$ |Sick2$^{(0.5)}$
6. Sick1 $\rightarrow$ Sick1X\_SHORTB\_USE$^{(0.5)}$ | B\_USE X\_SHORT B\_USE X\_SHORT B\_USE X\_SHORT B\_USE$^{(0.5)}$
7. Sick2 $\rightarrow$ B\_MAX$^{(1.0)}$ Table 2 shows the detailed grammar specification for both levels shown in FIG. 22. The spatiotemporal grammar uses time information to translate the same area symbols in many different ways. All the possible area symbols are divided into B and X, where B stands for bathroom and X symbolizes any other area in the house. Lines 6-9 define the semantics detected at this level. Note that B\_USE and B\_MAX as well as X\_SHORT and X\_MAX are different interpretations of the same area symbol (B and X, respectively) based on the available time information. B\_USE (Line 6) represents normal use of the bathroom area if the person is at the bathroom for at least $t_{min}^B$. Conversely, B\_MAX (Line 7) represents abnormal use of the bathroom if the person is inside the bathroom for more than a maximum amount of time $t_{max}^B$. In the same way, X\_SHORT and X\_MAX semantics (Lines 8-9) correspond to the person being in any other area in the house for at least $t_{min}^X$ and $t_{max}^X$ respectively.

The spatiotemporal semantics B\_USE, B\_MAX, X\_SHORT, X\_MAX are then used by the grammar at Level 2 to detect if the monitored person is sick or not. Line 5 of the second level grammar defines the adjective "sick" as two possible semantics Sick1 and Sick2. Sick2 is identified when the monitored person spends more than the maximum allowed time at the bathroom while Sick1 is identified when the person visits the bathroom at least four times in short time intervals. Note that the second level grammar operates on semantics that embed time information. However, the design of the second level grammar remains extremely simple. This is due to the modularity of the framework.

The time semantics defined at Lines 10-13 might be overlapping. In practice, this means that the same sequence of time events $t_u$ can be translated into several of these semantics and not just one. This ambiguity is implicitly taken care of the probabilistic parsing. For instance, consider the following input sequence:

B $t_u$ $t_u$ $t_u$ $t_u$ $t_u$ $t_u$ $t_u$ $t_u$ $t_u$ $t_u$

This sequence of symbols can be translated in two different semantics: B_USE and B_MAX. B_USE can be produced by first applying the production rule described in Line 6 and then nine times the recursive part of the production rule described in Line 10. After this, B_USE is produced by applying the rightmost part of the production rule described in Line 10. In the same way, B_MAX can be produced by first applying the production rule in Line 7 and then applying once the rightmost part of the production rule described in Line 11. Since a probability is assigned to each production rule, the probabilities of generating the two semantics can be estimated by multiplying the probabilities of the individual production rules used in each derivation. Using the probabilities shown in Table 2:

$$p_{B_{USE}} = 1.0 \times (0.5)^9 \times 0.5 = 0.000976$$

$$p_{B_{MAX}} = 1.0 \times 0.5 = 0.5$$

In this case, the probabilistic parser would return the most probable parsing, that is, B_MAX. Now the B_MAX semantic paired with the probability 0.5 becomes the output of the spatiotemporal grammar and the input to the Level 2 grammar in the hierarchy.

The same grammar structure can operate on the data provided by a set of RFIDs attached to the main objects in the kitchen such as the refrigerator, the stove, the dining table, etc. An RFID reader attached to the person using the kitchen could then be used to identify the area in the kitchen where the person is located and provide the required area information to the higher layers of the inference structure. This can improve the robustness of the system by providing more reliable input. For instance, knowing that the person in the kitchen opened the refrigerator and got something out of it leads to a more robust identification of both the R area and the AccessFood semantic. However, the way that these areas and semantics are used in the grammar does not have to change based on the type of sensing used to identify them. Exactly the same system is able to recognize everyday activities with any type of sensing modalities as long as these modalities provide the necessary area information detection. The accuracy of the sensing modality used to detect areas directly affects the performance of the system.

In addition, moving from abstract sensing such as areas and time down to more detailed sensing such as a sequence of specific ingredients and cookware used, provides the ability to build grammars on top of these sequences that can not only identify that someone is cooking but they can also provide a belief of what exactly this person is cooking. This can be easily done since cooking of a specific meal requires using specific ingredients and cookware. For example, RFIDS have been placed on the cookware and on specific food packages (salad, cheese, tea, etc.). This can provide a sequence of different ingredients and cookware used in the activity. Defining a grammar over these provides a meaningful way of zooming in the cooking process and identifying the exact meal that is prepared. Zooming out of the kitchen and house scale, one could use GPS and satellite maps to process activities on a much larger scale. The elegance of the proposed architecture therefore lies on the use of a simple, yet powerful, structure that repeats itself to finer or coarser granularity combining together a wide variety of technologies. This property not only allows the disclosed architecture to scale on heterogeneous networks and network hierarchies, it also makes it easier to implement on sensor nodes.

A series of experiments were conducted that collected an extended data set in a kitchen deployment. A VGA camera module with a fish-eye lens (162 degree viewing angle) was mounted on the kitchen ceiling, at a position that could observe most of the kitchen area. The images from the camera were re-sampled to a resolution of 128×128 pixels and were used to record the location of a person moving in the kitchen at 15 frames per second. The locations of a person were approximated by computing the centroid of motion. Two consecutive frames where subtracted from each other to find which pixels had changed, and the centroid of the moving pixels was used as a location estimate. The analysis used the resulting 2D coordinate system in the 128×128 resolution. A time series of locations on the image plane was collected using a custom camera interface tool running on the PC attached to the camera. Note, that this system is different from typical vision systems in the sense that the camera is used as a simple sensor that provides image centroids based on the observed motion in the scene. This system did not use any complex vision algorithms to perform human, object or action detection.

The data collected using this experimental setup was used to evaluate both the efficiency of the area sensor calibration and the recognition performance of the proposed hierarchical grammar. To evaluate the performance of the grammar hierarchy the PCFG implementation in the Natural Language Toolkit (http://nltk.sourceforge.net) was used, which incorporates a Viterbi style parser for PCFGs. NLTK's PCFG parser is a bottom-up parser that uses dynamic programming techniques to find the most probable parse for a sequence of observed input symbols. To evaluate the middleware infrastructure two camera enabled XYZ sensor nodes were used along with a single MicaZ mote. The middleware was implemented on top of the SOS operating system.

The sensing layer converts the time series of image locations into a time series of visited areas in the kitchen. During this conversion, two main sources of error might appear:
1. False Positives: occur when someone is merely passing by an area without actually using the object (for instance, refrigerator, stove, etc.) in this area.
2. False Negatives: occur when someone is actually present at one of the areas but the recorded image locations are not translated into this area.

Both sources of error can be important for the correct and robust operation of a grammar hierarchy. False positives should be minimized because they might increase the size of input to the grammar hierarchy and therefore the execution time of the grammar. False negatives should also minimized since missing area information might be critical to the recognition output of the inference framework.

To minimize both types of errors, a 3-stage filtering approach was used. The first stage of filtering was responsible for transforming locations on the image plane to areas. First areas of interest were defined experimentally. After examining a data set recorded when a subject was performing a specific activity at different parts of the kitchen the areas of interest were selected to be the minimum needed to trigger the presence of activity at these areas. FIG. 23 shows the selected areas, and representative data sets of cooking, cleaning and sorting the groceries collected at different days. These area definitions were subsequently used in the rest of the experiments. Although these area definitions were chosen to minimize false positives, this did not imply that they completely eliminate false positives/negatives. However, the small errors introduced by the coarse area definitions can be efficiently handled by the careful design of the grammar hierarchy.

The resulted area sequences had to be further processed at the sensor level before they could be directly fed as input to the grammar hierarchy. This had to be done so that the minimum possible sequence of areas was fed to the grammar hierarchy since the length of the sequence directly affects the execution time of the grammars.

After the first stage of filtering, the area sensor node could provide any sequence of the following areas: R, P, S, ST, D and U where U stands for Undefined and represents the rest of the kitchen area. While the person who is cooking is moving around the kitchen a large number of U areas are recorded as verified by FIG. 23. Instead of designing the grammar hierarchy to deal with the Undefined areas two additional stages of filtering were used for three main reasons:
1. The number of the Undefined areas corresponded to approximately half of the size of the area's sequence. Therefore, removing Undefined areas would significantly reduce the size of the input to the grammar and thus the execution time of grammars.
2. Because of the noisy image centroids and the minimal definition of the areas, the area sensor provided a large number of areas of the form: U S U S U S even though the person in the kitchen is always at the sink for example.
3. The grammar specification would become very complex in order to provide support for the Undefined areas.

The second filtering stage was responsible for removing all the Undefined areas from the area sequence produced by the first filtering stage. In the third filtering stage, all consecutive areas of the same type were merged into a single area symbol. After this 3-stage calibration of the area sensor the generated sequence of areas could be directly fed to the grammar hierarchy.

In every experiment the person in the kitchen was preparing either breakfast or dinner. The data collection started when the person was entering the kitchen or while he was already in the kitchen. It was stopped when the person started eating breakfast/dinner at the dining table. The person cooking each time was not aware of what he would have to cook until a couple of minutes before the recording of the data. This prevented the person from using pre-meditated moves. The person cooking was also unaware of the actual grammar hierarchy definition. In total, 10 cooking traces were collected lasting from approximately 10 minutes (breakfast) to 50 minutes (dinner) each.

In order to challenge the capabilities of the proposed scheme, a set of activities other than cooking was recorded in the same kitchen area. In total, 5 different traces were recorded at different days. These activities included cleaning the kitchen after having dinner, cleaning the floor of the kitchen and sorting the groceries after returning back home from the super-market. Especially, when cleaning up the kitchen after having dinner, the areas visited are almost the same as when cooking. This can be seen in FIG. 23A and FIG. 23B. The recorded traces of image locations are very similar. However, the grammar hierarchy should only recognize the cooking activity trace.

For each recorded activity trace, the ground truth area information activity was also recorded. This was done manually by a person that examined a recorded video for each recorded trace. The ground truth area information was used to investigate the false negatives and positives of the area sensor.

TABLE 3

Recognition performance of the proposed cooking grammar hierarchy.

| Kitchen Activity | Number of Traces | Correctly Classified | |
|---|---|---|---|
| | | Ground Truth | Filtered |
| Cooking | 10 | 10 | 10 |
| Cleaning | 5 | 4 | 5 |
| Other | 1 | 1 | 1 |

Table 3 shows the recognition results of the proposed grammar hierarchy for all the recorded activities and for both the ground truth data and the actual data provided by the area sensor. In both cases all the cooking activities were correctly classified. The proposed scheme can differentiate between very similar activities such as cooking and cleaning. This demonstrated that the grammar definition was general enough to capture various instances of cooking activities but at the same time it was specific enough to robustly differentiate cooking from other similar activities. This was a result of the second level grammar definition shown in Table 1. There, the cooking activity must always include visits to the stove and it should always include a transition to the dining table after the last visit to the stove. However, when people are cleaning, they either do not visit the stove area or any other area (for instance cleaning the floor or sorting the groceries) or they do not move to the dining table after cleaning everything (including the stove). These restrictions in the description of the cooking activity allow the system to differentiate between cooking and cleaning

TABLE 4

The effect of imperfect sensing in the observed sequences of areas for 3 typical activities in the kitchen.

| Kitchen Activity | Number of Areas (Ground Truth) | Number of Areas After Filtering |
|---|---|---|
| Dinner | 116 | 109 |
| Breakfast | 15 | 19 |
| Cleaning 1 | 12 | 9 |
| Cleaning 2 | 11 | 17 |

Figure 23B:
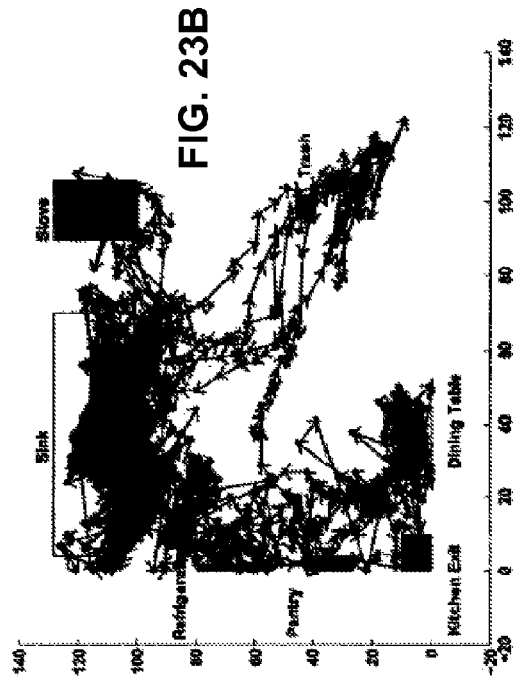
FIG. 23B is an area definition and example data set when cleaning up after dinner.
Figure 23D:
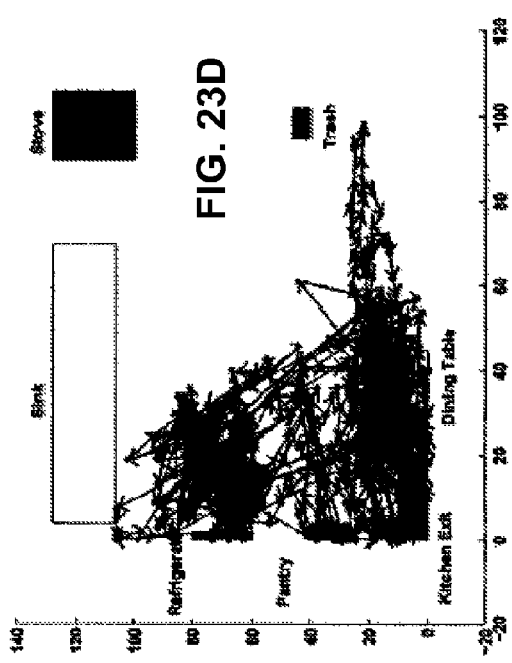
FIG. 23D is an area definition and example data set when sorting groceries.
Figure 23A:
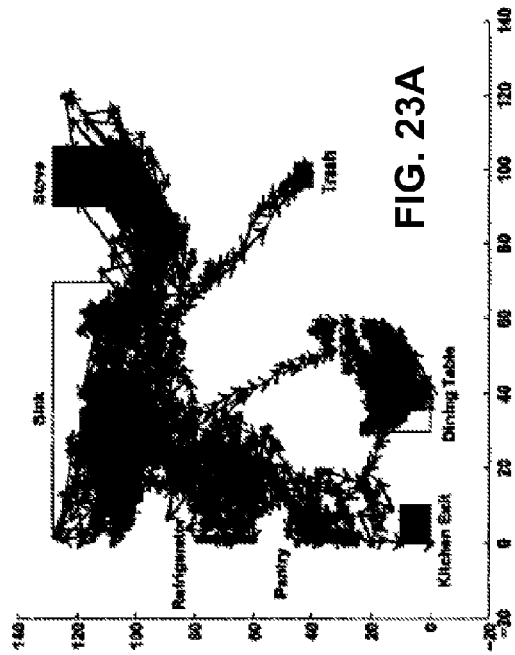
FIG. 23A is an area definition and example data set when cooking dinner.
Figure 23C:
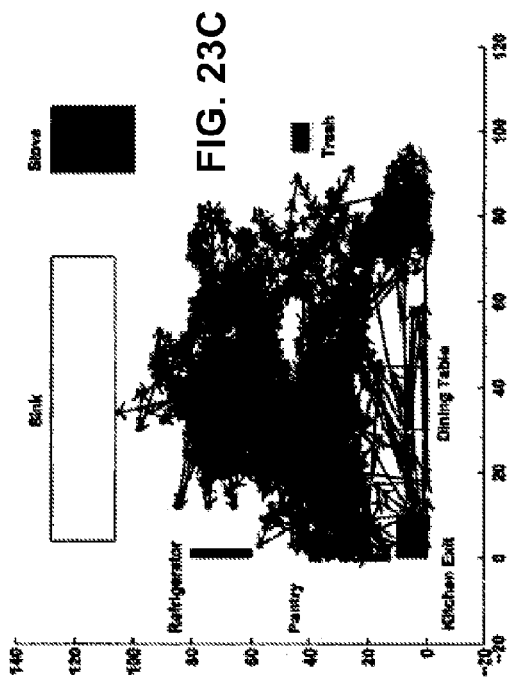
FIG. 23C is an area definition and example data set when cleaning the floor.

However, as can be seen in Table 3, the system failed to correctly classify the cleaning activity shown in FIG. 23B when the ground truth data was used. This was due to the successful calibration of the area sensor. The table area was defined by using real image locations acquired when a person was sitting or standing up at the table. This data gave a very precise definition of the table area. While cleaning the table, for instance picking up the plates and putting them into the sink, people do not sit at the dining table and therefore the area sensor would rarely detect the dining table area in such a case. However, this table area information is recorded in the ground truth data. As a result, the grammar hierarchy observed someone spending time at the stove and then moving back to the dining table. Based on the grammar definition this was a typical cooking activity and the specific trace was incorrectly classified as cooking. In general, since area only information was used to define cooking, the system could classify activities other than cooking as cooking because they produce the same sequence of areas. For example, if a person is moving on a circle inside the kitchen and stops by the refrigerator, stove, sink, and dining table then this person's activity could be classified as cooking if the person after a while stops at the dinning table. However, the person was just visiting the different areas in the kitchen without performing any actions. This highlights the importance of the sensing layer in the robustness of the system. However, the present system is independent of the actual sensing layer since it is structured only on the type of information provided by the sensors and not on the type of the sensors used to acquire this information.

The experimental data provides insight on how to better calibrate the area sensor. Table 4 shows the number of area symbols generated by the area sensor versus the ground truth number of area symbols for four of the collected traces. It is clear that the area sensor gives both false positives and false negatives. The false positives are caused by the fact that the area of the kitchen was small. As a result, the areas of the refrigerator and the pantry are very close and when a person tries to use the pantry it is possible that the refrigerator area will also be recognized. The false negatives are mainly caused by small movements of the person in the kitchen that cannot be robustly captures at the resolution of 128×128. For instance, in many cases the person was able to reach the sink by simply stretching but without moving out of the stove area. In this case, the sink would appear in the ground truth data but not in the output of the area sensor.

TABLE 5

The effect of raw sensing data filtering on 3 typical activities in the kitchen.

| Kitchen Activity | Number of Centroids | Number of Areas After Filtering | | |
|---|---|---|---|---|
| | | Stage 1 | Stage 2 | Stage 3 |
| Dinner | 6648 | 1456 | 728 | 109 |
| Breakfast | 2924 | 446 | 223 | 12 |
| Cleaning | 2583 | 421 | 211 | 9 |

Figure 24:
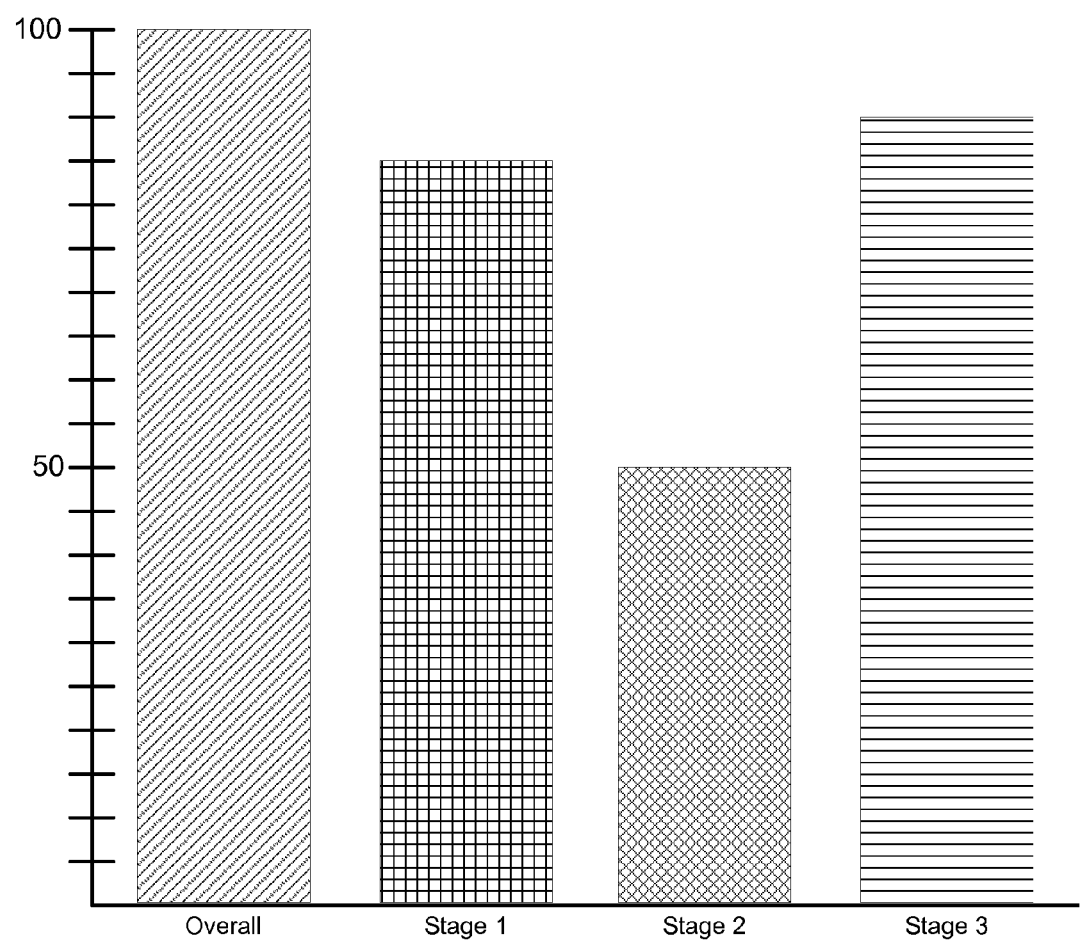
FIG. 24 is a bar graph indicating filtering reduction success.

FIG. 24 shows the effect of the 3-stage sensor calibration on the size of the final input to the grammar hierarchy for all the collected experimental data. The average percentage of information reduction at each stage of the calibration and the total one are shown. The overall average information reduction is approximately 99%. This is the percentage of reduction in the number of symbols that are given as input to the grammar hierarchy and the number of image locations initially recorded. The average percentage of information reduction for each one of the 3 stages of filtering is illustrated by the other three bars in FIG. 24. At stage 1 there is a reduction of 85% from translating the raw image locations to areas (including the Undefined area). At stage 2, there was a reduction of approximately 50% by simply removing all the Undefined areas. At stage 3, the number of symbols is reduced by 90% and the final area sequence is fed to the grammar hierarchy. Table 5 provides some more insight into the effect of sensor calibration in the size of input fed to the inference framework. In the case of dinner preparation, 6648 image locations were acquired that were finally reduced down to only 109 area symbols. Similarly, in the cases of preparing breakfast and cleaning, 2924 and 2583 image locations were reduced down to 12 and 9 area symbols respectively. These numbers demonstrate the feasibility of such a system running in real time on a sensor network. An input of 10 to 20 symbols is relatively small and can be parsed in a very short period of time even on a sensor node. In addition, the fact that activities lasting as much as 50 minutes can be reduced down to a sequence of only 100 symbols shows that modeling human activity as a sequence of actions meets the real time requirements and limitations of sensor networks.

C. Example 3

Grammar Triggered Communication

To test grammar triggered communication a set of four areas was defined on the boundaries of the area covered by the camera and labeled them as N, S, E and W to represent each of the horizon points: north, south, east, west. These were set to detect the exit of a person from the coverage area of a camera. Each node included the following grammar at the lowest level of its hierarchy.

M: L 'U' (produce('U');}
|L 'N' (notify_neighbor('N');}
|L 'S' (notify_neighbor('S');}
|L 'E' (notify_neighbor('E');}
|L 'W' (notify_neighbor('W');}
L: T|L T;
I: 'U'|'N'|'S'|'E'|'W';

This was tested with a small deployment on the ceiling of a lab, using XYZ nodes. The nodes were preconfigured with the node IDs of their adjacent nodes at the four horizon points. In this setup, the grammar triggered the communication and transferred state to the appropriate node when a person moved from one coverage area to the next. Using a 4 fps framerate on XYZ it was determined that each of the four regions required a width of 5 pixels to successfully perform a data handoff for a person moving up to two feet per second. This is approximately six inches on the floor when the camera is installed on a nine foot ceiling. The average state transition latency for a 20 byte payload in an SOS message over an IEEE 802.15.4 radio was measured to be 8.4 ms.

By using the above grammar as part of the Level 1 grammar on each node, communication and transfer of state was triggered by the grammar, so that multiple nodes were tiled to increase the coverage of the system over a larger region, such as a house, without compromising the output quality of the grammar.

While the methods, systems, and apparatuses have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A method for identifying a human behavior of an entity that takes place in space and time, comprising:

a) receiving sensor data related to an action sequence of the entity from a plurality of sensors that are positioned at respective nodes of a sensor network;

b) interpreting the sensor data according to a grammar hierarchy to produce a current set of semantics;

c) determining if a higher level grammar hierarchy exists;

d) interpreting the current set of semantics according to the higher level grammar hierarchy to produce a new set of semantics, wherein the new set of semantics comprises human behaviors of the current set of semantics that are interpreted as higher order human behaviors that take place at a more macroscopic level than the scale of the human behaviors of the current set of semantics;

e) identifying the new set of semantics as the current set of semantics;

f) repeating steps c, d and e, until it is determined that no higher level grammar hierarchy exists; and g) outputting the current set of semantics as indicative of a particular human behavior of the entity, wherein each grammar level for each node generates outputs from the sensor data generated by each node, wherein the current set of semantics for each node is propagated across the sensor network; and wherein each grammar hierarchy level computes a set of probabilities for each human behavior such that lower level grammar hierarchies infer simple human behaviors that allow for higher level grammar hierarchies to infer higher order human behaviors that take place at a more macroscopic level.

2. The method of claim 1, wherein each sensor comprises at least one sensing modality.

3. The method of claim 2, wherein the sensor data is related to a spatial position of the entity.

4. The method of claim 3, wherein the sensor data is related to a time that the entity is at the spatial position.

5. The method of claim 1, wherein the grammar hierarchies comprises hierarchies of probabilistic context free grammars.

6. The method of claim 5, wherein the probabilistic context free grammars comprise spatial hierarchies.

7. The method of claim 5, wherein the probabilistic context free grammars comprise spatio-temporal hierarchies.

8. The method of claim 1, wherein the step of interpreting the sensor data according to the grammar hierarchy to produce a new set of semantics comprises:

assembling the sensor data into a sequence of sensor measurements;

converting the sequence of sensor measurements to a sequence of phonemes;

converting the sequence of phonemes into a plurality of sequences of human behaviors;

computing a sequence probability for each sequence of human behaviors based on a probability associated with each human behavior; and selecting the sequence of human behaviors with the highest sequence probability as the new set of semantics.

9. The method of claim 1, wherein the step of interpreting the sensor data according to the grammar hierarchy to produce a new set of semantics comprises:

assembling the sensor data into a sequence of sensor measurements and times;

converting the sequence of sensor measurements and times into a plurality of sequences of time durations at spatial positions;

computing a sequence probability for each sequence of time durations at spatial positions based on a probability associated with each duration of time at a spatial position; and selecting the sequence of durations of times at spatial positions with the highest sequence probability as the new set of semantics.

10. The method of claim 1, wherein repeating steps c, d, and e, comprises:

converting the current set of semantics into a plurality of sequences of human sub-behaviors;

computing a sequence probability for each sequence of human sub-behaviors based on a probability associated with each human sub-behavior; and selecting the sequence of human sub-behaviors with the highest sequence probability as the new set of semantics.

11. A method for determining a behavior of an entity that takes place in space and time, comprising:

receiving sensor measurements from a plurality of sensors that are positioned at respective nodes of a sensor network, wherein the sensor measurements are related to a spatial position or context of an entity;

interpreting the sensor measurements as phonemes according to a phoneme definition;

interpreting the phonemes according to a first grammar hierarchy to produce a first set of semantics, wherein the first grammar hierarchy comprises a plurality of human behaviors associated with a plurality of spatial positions; and interpreting the first set of semantics according to a second grammar hierarchy to produce a second set of semantics, wherein the second set of semantics is indicative of the human behavior of the entity that takes place at a more macroscopic level than the scale of the human behaviors of the first set of semantics, wherein the first and second grammar hierarchy for each node generates outputs from the sensor data generated by each node, wherein the second set of semantics for each node is propagated across the sensor network; and wherein each grammar hierarchy computes a set of probabilities for each human behavior such that first level grammar hierarchies infer simple human behaviors that allow for the second grammar hierarchies to infer higher order human behaviors that take place at a more macroscopic level.

12. The method of claim 11, wherein the first grammar hierarchy and the second grammar hierarchy are comprised of hierarchies of probabilistic context free grammars.

13. The method of claim 12, wherein the plurality of spatial positions has been predefined.

14. The method of claim 13, wherein the step of interpreting the sensor measurements according to the first grammar hierarchy to produce a first set of semantics comprises:

assembling the sensor measurements into a sequence of phonemes;

converting the sequence of phonemes into a plurality of sequences of human behaviors;

computing a sequence probability for each sequence of human behaviors based on a probability associated with each human behavior; and selecting the sequence of human behaviors with the highest sequence probability as the first set of semantics.

15. The method of claim 13, wherein the first grammar hierarchy further comprises a plurality of exceptions.

16. The method of claim 14, further comprising:

filtering an exception from the first set of semantics, thus preventing the first set of semantics from comprising the exception; and triggering an action based on the exception.

17. The method of claim 13, wherein the second grammar hierarchy comprises a plurality of human sub-behaviors associated with the plurality of human behaviors.

18. The method of claim 17, wherein the step of interpreting the first set of semantics according to the second grammar hierarchy to produce a second set of semantics comprises:
converting the first set of semantics into a plurality of sequences of human sub behaviors;
computing a sequence probability for each sequence of human sub-behaviors based on a probability associated with each human sub-behavior; and
selecting the sequence of human sub-behaviors with the highest sequence probability as the second set of semantics.

19. The method of claim 18, further comprising:
filtering an exception from the second set of semantics, thus preventing the second set of semantics from comprising the exception; and
triggering an action based on the exception.

20. The method of claim 13, wherein the sensor measurements further comprise data related to a time the entity is at a position.

21. The method of claim 20, wherein the first grammar hierarchy comprises a plurality of time durations associated with the plurality of spatial positions.

22. The method of claim 21, wherein the step of interpreting the sensor measurements according to the first grammar hierarchy to produce a first set of semantics comprises:
assembling the sensor measurements into a sequence of spatial positions and times;
converting the sequence of spatial positions and times into a plurality of sequences of time durations at spatial positions;
computing a sequence probability for each sequence of time durations at spatial positions based on a probability associated with each duration of time at a spatial position; and
selecting the sequence of time durations at spatial positions with the highest sequence probability as the first set of semantics.

23. The method of claim 22, wherein the second grammar hierarchy comprises a plurality of human behaviors associated with the plurality of time durations associated with the plurality of spatial positions.

24. The method of claim 23, wherein the step of interpreting the first set of semantics according to the second grammar hierarchy to produce a second set of semantics comprises:
converting the first set of semantics into a plurality of sequences of human behaviors;
computing a sequence probability for each sequence of human behaviors based on a probability associated with each human behavior; and
selecting the sequence of human behaviors with the highest sequence probability as the second set of semantics.

25. The method of claim 24, further comprising:
filtering an exception from the second set of semantics, thus preventing the second set of semantics from comprising the exception; and
triggering an action based on the exception.

26. A system for identifying a behavior of an entity that takes place in space and time, comprising:
a sensor;
a memory;
a processor, coupled to the sensor and the memory, wherein the processor is configured for performing the steps of:

a) receiving sensor data related to an action sequence of the entity from the sensor and storing the sensor data on the memory;
b) interpreting the sensor data according to a grammar hierarchy to produce a current set of semantics;
c) determining if a higher level grammar hierarchy exists;
d) interpreting the current set of semantics according to the higher level grammar hierarchy to produce a new set of semantics, wherein the new set of semantics comprises human behaviors of the current set of semantics that are interpreted as higher order human behaviors that take place at a more macroscopic level than the scale of the human behaviors of the current set of semantics;
e) identifying the new set of semantics as the current set of semantics;
f) repeating steps c, d and e, until it is determined that no higher level grammar hierarchy exists; and
g) outputting the current set of semantics as indicative of a particular human behavior of the entity,
wherein each grammar level for each node generates outputs from the sensor data generated by each node, wherein the current set of semantics for each node is propagated across the sensor network; and wherein each grammar hierarchy level computes a set of probabilities for each human behavior such that lower level grammar hierarchies infer simple human behaviors that allow for higher level grammar hierarchies to infer higher order human behaviors that take place at a more macroscopic level.

27. The system of claim 26, wherein each sensor comprises at least one sensing modality.

28. The system of claim 27, wherein the sensor data is related to a spatial position of the entity.

29. The system of claim 28, wherein the sensor data is related to a time that the entity is at the spatial position.

30. The system of claim 26, wherein the grammar hierarchies comprises hierarchies of probabilistic context free grammars.

31. The system of claim 30, wherein the probabilistic context free grammars comprise spatial hierarchies.

32. The system of claim 30, wherein the probabilistic context free grammars comprise spatio-temporal hierarchies.

33. The system of claim 26, wherein the step of interpreting the sensor data according to the grammar hierarchy to produce a new set of semantics comprises:
assembling the sensor data into a sequence of sensor measurements;
converting the sequence of sensor measurements to a sequence of phonemes;
converting the sequence of phonemes into a plurality of sequences of human behaviors;
computing a sequence probability for each sequence of human behaviors based on a probability associated with each human behavior; and
selecting the sequence of human behaviors with the highest sequence probability as the new set of semantics.

34. The system of claim 26, wherein the step of interpreting the sensor data according to the grammar hierarchy to produce a new set of semantics comprises:
assembling the sensor data into a sequence of sensor measurements and times;
converting the sequence of sensor measurements and times into a plurality of sequences of time durations at spatial positions;

computing a sequence probability for each sequence of time durations at spatial positions based on a probability associated with each duration of time at a spatial position; and selecting the sequence of durations of times at spatial positions with the highest sequence probability as the new set of semantics.

35. The system of claim 26, wherein repeating steps c, d, and e, comprises:
converting the current set of semantics into a plurality of sequences of human sub behaviors;
computing a sequence probability for each sequence of human sub-behaviors based on a probability associated with each human sub-behavior; and
selecting the sequence of human sub-behaviors with the highest sequence probability as the new set of semantics.

36. The system of claim 26, wherein the sensor is at least one of a camera, a timer, a GPS, an infrared detector, a sound detector, a current sensor, a contact sensor, a pressure sensor, and a passive infrared sensor.

37. A computer readable medium with computer executable instructions embodied thereon for performing the steps comprising:
a) receiving sensor data related to an action sequence of the entity from a sensor;
b) interpreting the sensor data according to a grammar hierarchy to produce a current set of semantics;
c) determining if a higher level grammar hierarchy exists;
d) interpreting the current set of semantics according to the higher level grammar hierarchy to produce a new set of semantics, wherein the new set of semantics comprises human behaviors of the current set of semantics that are interpreted as higher order human behaviors that take place at a more macroscopic level than the scale of the human behaviors of the current set of semantics;
e) identifying the new set of semantics as the current set of semantics;
f) repeating steps c, d and e, until it is determined that no higher level grammar hierarchy exists; and
g) outputting the current set of semantics as indicative of a particular human behavior of the entity,
wherein each grammar level for each node generates outputs from the sensor data generated by each node, wherein the current set of semantics for each node is propagated across the sensor network; and wherein each grammar hierarchy level computes a set of probabilities for each human behavior such that lower level grammar hierarchies infer simple human behaviors that allow for higher level grammar hierarchies to infer higher order human behaviors that take place at a more macroscopic level.

38. The computer readable medium of claim 37, wherein each he sensor comprises a sensor network with at least one sensing modality.

39. The computer readable medium of claim 38, wherein the sensor data is related to a spatial position of the entity.

40. The computer readable medium of claim 39, wherein the sensor data is related to a time that the entity is at the spatial position.

41. The computer readable medium of claim 37, wherein the grammar hierarchies comprises hierarchies of probabilistic context free grammars.

42. The computer readable medium of claim 41, wherein the probabilistic context free grammars comprise spatial hierarchies.

43. The computer readable medium of claim 41, wherein the probabilistic context free grammars comprise spatio-temporal hierarchies.

44. The computer readable medium of claim 37, wherein the step of interpreting the sensor data according to the grammar hierarchy to produce a new set of semantics comprises:
assembling the sensor data into a sequence of sensor measurements;
converting the sequence of sensor measurements to a sequence of phonemes;
converting the sequence of phonemes into a plurality of sequences of human behaviors;
computing a sequence probability for each sequence of human behaviors based on a probability associated with each human behavior; and
selecting the sequence of human behaviors with the highest sequence probability as the new set of semantics.

45. The computer readable medium of claim 37, wherein the step of interpreting the sensor data according to the grammar hierarchy to produce a new set of semantics comprises:
assembling the sensor data into a sequence of sensor measurements and times;
converting the sequence of sensor measurements and times into a plurality of sequences of time durations at spatial positions;
computing a sequence probability for each sequence of time durations at spatial positions based on a probability associated with each duration of time at a spatial position; and
selecting the sequence of durations of times at spatial positions with the highest sequence probability as the new set of semantics.

46. The computer readable medium of claim 37, wherein repeating steps c, d, and e, comprises:
converting the current set of semantics into a plurality of sequences of human sub behaviors;
computing a sequence probability for each sequence of human sub-behaviors based on a probability associated with each human sub-behavior; and
selecting the sequence of human sub-behaviors with the highest sequence probability as the new set of semantics.

* * * * *

UNITED STATES PATENT AND TRADEMARK OFFICE
CERTIFICATE OF CORRECTION

PATENT NO.         : 8,630,965 B2                                       Page 1 of 1
APPLICATION NO.    : 12/296078
DATED              : January 14, 2014
INVENTOR(S)        : Andreas Savvides et al.

It is certified that error appears in the above-identified patent and that said Letters Patent is hereby corrected as shown below:

On the Title Page

Please replace the Assignee information to the face of issued U.S. Patent No. 8,663,429, with the following paragraph:

item --(73) Assignee: Yale University, New Haven, CT (US)
                     University of Maryland, College Park, MD (US)--

In the Specification

Column 1, after the Title, please add the following paragraph:

--This invention was made with government support under 0448082 awarded by the National Science Foundation. The government has certain rights in this invention.--

Signed and Sealed this
Fifth Day of August, 2014

Michelle K. Lee
*Deputy Director of the United States Patent and Trademark Office*

UNITED STATES PATENT AND TRADEMARK OFFICE
CERTIFICATE OF CORRECTION

PATENT NO.       : 8,630,965 B2                                                Page 1 of 1
APPLICATION NO. : 12/296078
DATED            : January 14, 2014
INVENTOR(S)      : Savvides et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1205 days.

Signed and Sealed this
Twenty-second Day of September, 2015

Michelle K. Lee
*Director of the United States Patent and Trademark Office*